(12) United States Patent
Kennedy et al.

(10) Patent No.: US 8,594,061 B2
(45) Date of Patent: Nov. 26, 2013

(54) METHODS AND APPARATUS TO ACCESS NETWORK CONNECTIVITY INFORMATION USING PREDICTED LOCATIONS

(75) Inventors: Richard Howard Kennedy, Austin, TX (US); Stephen McCann, Rownhams (GB); David Steer, Nepean (CA); Rene Waraputra Purnadi, Irving, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 297 days.

(21) Appl. No.: 12/820,883

(22) Filed: Jun. 22, 2010

(65) Prior Publication Data

US 2011/0310865 A1 Dec. 22, 2011

(51) Int. Cl.
*H04W 4/00* (2009.01)

(52) U.S. Cl.
USPC .......................................... 370/338

(58) Field of Classification Search
None
See application file for complete search history.

(56) References Cited

U.S. PATENT DOCUMENTS

| | | | |
|---|---|---|---|
| 6,643,517 B1 | 11/2003 | Steer | |
| 6,845,246 B1 | 1/2005 | Steer | |
| 7,551,892 B1 | 6/2009 | Elliott | |
| 2002/0029108 A1 | 3/2002 | Liu et al. | |
| 2002/0115465 A1* | 8/2002 | Komatsu | 455/522 |
| 2007/0211676 A1 | 9/2007 | Sharma et al. | |
| 2007/0213046 A1 | 9/2007 | Li et al. | |
| 2008/0287141 A1 | 11/2008 | Vogel et al. | |
| 2009/0245199 A1 | 10/2009 | Pathan et al. | |
| 2009/0298522 A1 | 12/2009 | Chaudhri et al. | |
| 2010/0046440 A1 | 2/2010 | Singh | |
| 2010/0153001 A1 | 6/2010 | Bauchot et al. | |
| 2010/0255794 A1 | 10/2010 | Agnew | |
| 2010/0323715 A1* | 12/2010 | Winters | 455/456.1 |
| 2011/0143761 A1* | 6/2011 | Uusitalo et al. | 455/450 |
| 2011/0250916 A1* | 10/2011 | Li et al. | 455/509 |
| 2011/0282945 A1 | 11/2011 | Thyni et al. | |

FOREIGN PATENT DOCUMENTS

| | | |
|---|---|---|
| CA | 2244366 | 3/1999 |
| WO | 02/18877 | 3/2002 |
| WO | 2005/027556 | 3/2005 |
| WO | 2009018300 | 2/2009 |
| WO | 2009032554 | 3/2009 |
| WO | 2009078540 | 6/2009 |
| WO | 2009156554 | 12/2009 |
| WO | 2011023206 | 3/2011 |
| WO | 2011070224 | 6/2011 |

OTHER PUBLICATIONS

Celebi et al., "Utilization of Location Information in Cognitive Wireless Networks," IEEE Wireless Communications, Aug. 1, 2007, 8 pages.

(Continued)

*Primary Examiner* — Yong Zhou
(74) *Attorney, Agent, or Firm* — Hanley, Flight & Zimmerman, LLC

(57) ABSTRACT

Example methods and apparatus to access network connectivity information based on predicted future locations of wireless terminals are disclosed. A disclosed example method involves predicting at least one future location of a wireless terminal. The example method also involves requesting at least first and second network connectivity information sets for connecting to at least one access network providing wireless communication coverage at the at least one future location. The first network connectivity information is associated with a first geographic location, and the second network connectivity information is associated with a second geographic location.

20 Claims, 11 Drawing Sheets

(56) References Cited

OTHER PUBLICATIONS

Gurney et al., "Geo-Location Database Techniques for Incumbent Protection in the TV White Space," 3rd IEEE Symposium, Oct. 14, 2008, 9 pages.

Patent Cooperation Treaty, "International Search Report," issued by the International Searching Authority in connection with PCT application No. PCT/US2011/040733, mailed Sep. 26, 2011 (4 pages).

Patent Cooperation Treaty, "Written Opinion of the International Searching Authority," issued by the International Searching Authority in connection with PCT/US2011/040733, mailed Sep. 26, 2011 (14 pages).

Patent Cooperation Treaty, "International Search Report," issued by the International Searching Authority in connection with PCT application No. PCT/US2011/040734, mailed Sep. 14, 2011 (4 pages).

Patent Cooperation Treaty, "Written Opinion of the International Searching Authority," issued by the International Searching Authority in connection with PCT/US2011/040734, mailed Sep. 14, 2011 (10 pages).

Patent Cooperation Treaty, "International Search Report," issued by the International Searching Authority in connection with PCT application No. PCT/US2011/040735, mailed Sep. 12, 2011 (4 pages).

Patent Cooperation Treaty, "Written Opinion of the International Searching Authority," issued by the International Searching Authority in connection with PCT/US2011/040735, mailed Sep. 12, 2011 (10 pages).

Patent Cooperation Treaty, "International Search Report," issued by the International Searching Authority in connection with PCT application No. PCT/US2011/040738, mailed Sep. 27, 2011 (4 pages).

Patent Cooperation Treaty, "Written Opinion of the International Searching Authority," issued by the International Searching Authority in connection with PCT/US2011/040738, mailed Sep. 27, 2011 (11 pages).

Federal Communications Commission, "Second Report and Order and Memorandum Opinion and Order," FCC 08-260, Nov. 14, 2008, [retrieved from http://hraunfoss.fcc.gov/edocs_public/attachmatch/FCC-08-260A1.pdf] 130 pages.

Electronic Code of Federal Regulations, FCC Part 15 Subpart H—15. 701 Scope, [retrieved from http://ecfr.gpoaccess.gov/cgi/t/text/text-idx?c=ecfr&rgn=div5&view=text&node=47:1.0.1.1.14&idno=47] 10 pages, Feb. 17, 2009.

United States Patent and Trademark Office, "Non-Final Office Action," issued in connection with U.S. Appl. No. 12/820,890, on Jul. 23, 2012 (10 pages).

United States Patent and Trademark Office, "Non-Final Office Action," issued in connection with U.S. Appl. No. 12/820,898, on Jul. 18, 2012 (10 pages).

United States Patent and Trademark Office, "Non-Final Office Action," issued in connection with U.S. Appl. No. 12/820,907, on Jul. 11, 2012 (8 pags).

"IEEE 802.11af/D0.03 Draft Standard for Information Technology—Telecommunications and information exchange between systems—Local and metropolitan area networks—Part 11: Wireless LAN Medium Access Control (MAC) and Physical Layer (PHY) specifications, Amendment 3: TV White Spaces Operation," IEEE 802 Committee of the IEEE Computer Society, IEEE P802.11af/D0.03, Jun. 4, 2010, 35 pages.

Taiwan Intellectual Property Office, "Office Action," issued in connection with Taiwan Application No. 100121100, on Jul. 25, 2013, 19 pages.

Taiwan Intellectual Property Office, "Office Action," issued in connection with Taiwan Application No. 100121104, on Aug. 23, 2013, 10 pages.

* cited by examiner

METHODS AND APPARATUS TO ACCESS NETWORK CONNECTIVITY INFORMATION USING PREDICTED LOCATIONS

FIELD OF THE DISCLOSURE

The present disclosure relates generally to network communications and, more particularly, to methods and apparatus to access network connectivity information using predicted locations.

BACKGROUND

Wireless network deployments, such as wireless local area networks (WLANs), allow wireless terminals to access network and Internet services when within proximity of wireless communication signals of those wireless networks. Some wireless networks use portions of the radio frequency (RF) spectrum that are shared between different types of devices (e.g., primary devices and secondary devices). Such different types of devices must share or use the shared RF spectrum in such a way that they do not interfere with one another when operating in close proximity of one another or in the same geographical area.

Sometimes, users of wireless terminals move between different locations in which there are located other devices with which the wireless terminals share the same portions of a frequency spectrum. To avoid interfering with the other devices, the wireless terminals can change their wireless connection settings.

DETAILED DESCRIPTION

Figure 1:
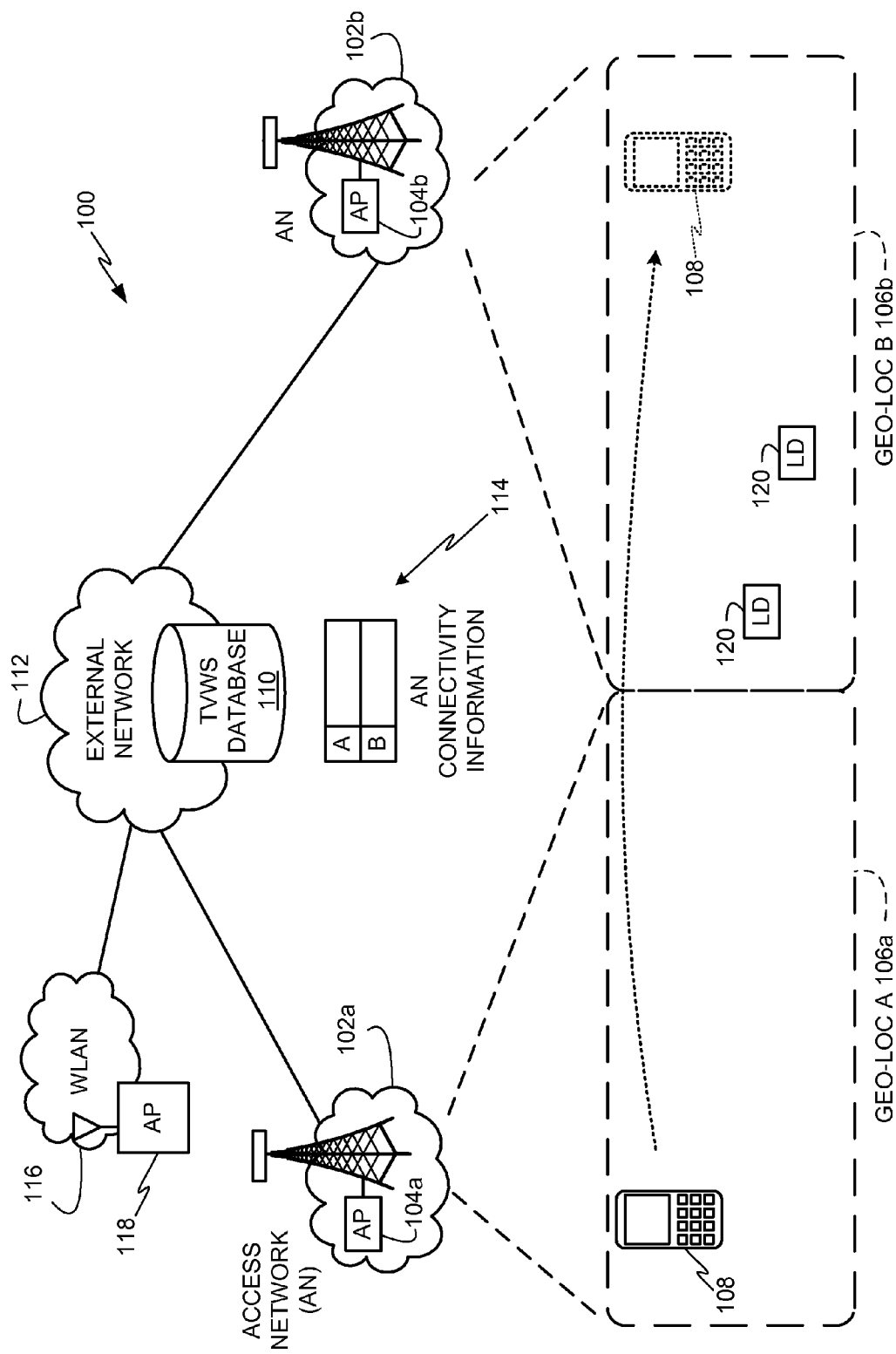
FIG. 1 depicts an example communication network in which an example wireless terminal retrieves access network (AN) connectivity information from an example television white space (TVWS) database for connecting to wireless access networks.

Although the following discloses example methods and apparatus including, among other components, software executed on hardware, it should be noted that such methods and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods and apparatus, persons having ordinary skill in the art will readily appreciate that the examples provided are not the only way to implement such methods and apparatus.

The example methods and apparatus described herein can be used to predict future locations (e.g., near-future locations) of wireless terminals, obtain network connectivity information from network connectivity databases indicative of capabilities and requirements for connecting (and/or maintaining connectivity while in motion) to access networks at different locations (e.g., at predicted future locations), select network connectivity configurations, and establish (or maintain) connections with access networks based on such configurations. The example methods and apparatus described herein can be used in connection with mobile communication devices, mobile computing devices, or any other device (including stationary communication devices) capable of communicating wirelessly with a wireless network. Such devices, also referred to as terminals, wireless terminals, television white space (TVWS) devices, TV band devices (TVBDs), or user equipment (UE), may include mobile smart phones (e.g., a BLACKBERRY® smart phone), wireless personal digital assistants (PDAs), laptop/notebook/netbook computers with wireless adapters, etc. The example methods and apparatus described herein may be implemented in connection with TVWS networks and associated standards and communication protocols. In addition, the example methods and apparatus described herein may be implemented in connection with the wireless local area network (WLAN) communication standard known as IEEE® (Institute for Electrical and Electronics Engineers) 802.11, which, among other things, defines interworking with external networks. However, the example methods and apparatus may additionally or alternatively be implemented in connection with other wireless communication standards including, but not limited to, other WLAN standards, other standards for operating in spectrum white space, personal area network (PAN) standards, wide area network (WAN) standards, wireless metropolitan area network (WMAN) standards (e.g., IEEE® 802.16 or WiMAX networks), wireless regional area network (WRAN) standards (e.g., IEEE® 802.22), cellular communication standards, or mobile satellite communications standards.

As described herein, some wireless networks use portions of radio frequency (RF) spectrum that is shared by different types of devices including TVWS devices, TVBDs, and/or other registered licensed devices. To avoid interfering with devices (e.g., registered licensed devices which may operate as primary devices having priority over secondary devices) in these shared RF spectrum portions, wireless communication devices (e.g., which may operate as secondary devices) can access network databases to obtain access network connectivity requirements to enable sharing the RF spectrum portions without interfering with other devices (e.g., primary devices). Such AN connectivity requirements may specify uses of channels (or frequency segments) based on geographical locations of other, licensed devices so that wireless terminals may use those channels (or frequency segments) without interfering with the other, licensed devices.

In the illustrated examples described herein, wireless terminals may operate as secondary devices in TVWS bands, while not interfering with primary devices such as TV broadcast equipment and licensed wireless microphones. For example, a TVWS database may be used to provide AN connectivity information to wireless terminals based on locations (e.g., defined by global positioning system (GPS) coordinates) in which those wireless terminals operate. The AN connectivity information specifies unused (and therefore available) channels and other data required to enable the wireless terminals to operate without interfering with primary, licensed users. In this manner, the primary, licensed users can be afforded protection from radio interference in a specified radius or area (e.g., a protection contour) around their licensed devices.

The example methods and apparatus described herein can be advantageously used to inform wireless terminals of the types of network connectivity that are available in different locations before the wireless terminal attempts connecting at those locations. For example, a person travelling between different locations may, in advance, query a network database about access network availability and connectivity capabilities/requirements at a predicted future location, so that upon arrival at the predicted future destination, the person's wireless device can connect to the available access network based on the retrieved access network connectivity capabilities/requirements information. Such predicted future locations may be near-future locations in a relatively small geographic area such as within two or more neighboring towns, within different parts of a town (e.g., near-future locations within blocks of one another), or any other relatively small geographic area in which a person may walk or move around using, for example, ground-based transportation. In some example implementations, the predicted future locations may be more distant future locations associated with relatively larger geographic areas such as different states or countries.

Such predictive retrieval of access network connectivity information may be advantageously used to ensure that wireless terminals use the appropriate frequency spectrum at their predicted future locations, as may be required by regulatory rules with respect to licensed users of frequency bands. Such is the case in TVWS frequency spectrum shared by TVBDs and other licensed white space devices such as television broadcast equipment or wireless microphones. Networks using TVWS frequency spectrum may be associated with one or more TVWS databases that store geographic protection contours for individual licensed devices (e.g., broadcast TV stations or licensed wireless microphones) that share TVWS frequency spectrum with mobile communication terminals (e.g., TVBDs implemented as mobile phones or other communication devices). In addition, the licensed wireless microphones using TVWS frequency spectrum may be mobile (e.g., for on-site news gathering) and subject to frequent changes to their protection boundaries as they are used at different remote locations. Thus, operating class information for such moving licensed devices may change frequently over time. The example methods and apparatus described herein may be used to keep mobile communication devices updated as to available access network connectivity capabilities to prevent interfering with licensed devices operating in the same frequency spectrum.

To protect individual licensed devices that are registered to use particular TVWS channels (e.g., TVWS frequency spectrum channels), the example methods and apparatus described herein may be used to enable mobile communication devices to determine their current locations and predict future locations to which the mobile communication devices may travel. Such locations may be near individual licensed devices that must be protected from interference caused by mobile communication device communications that are capable of using the same frequency channels as those individual licensed devices. The example methods and apparatus described herein may also be used to change access network connection configurations including making changes to channels of operation, operating bandwidth, transmit power of mobile devices to avoid such interference with the licensed devices, and/or any other parameter associated with access network connectivity information. The access network connectivity information described herein may be implemented as Regulatory Classes or Operating Classes defining different operational and location parameters for use in selecting access network connection configurations.

The predictive retrieval of access network connectivity information described herein may be advantageously used by wireless terminals to make decisions in advance regarding channel use (or other connection parameter use) to require fewer AN connection configuration changes during actual connection time, to optimize network connectivity, and/or to minimize power consumption. In some example implementations, the techniques described herein may also be used to select travel routes based on desired qualities of network connections.

Although the example methods and apparatus are described herein as retrieving and selecting access network information obtained from a TVWS database, the example methods and apparatus may similarly be used to access databases (e.g., information servers) storing information about accessing and connecting to other types of networks (e.g., WLAN access networks, cellular networks, etc.), including networks that use white space in bands other than TV bands, as regulatory domains make them available. In addition, the information message exchanges described herein between a TVBD and a TVWS database may be implemented using any suitable techniques including, for example, network query protocols, network message exchanges, email, short messaging service (SMS), and instant messaging, using both wired and wireless communication media.

In the illustrated examples described herein, example wireless terminals used to connect with TVWS access networks may be implemented using dual-mode or other multi-mode wireless terminals having wireless capabilities for connecting to the TVWS access networks (using TVWS protocols and TVWS channels) and for connecting to an IEEE® 802.11 WLAN access network. In other example implementations, the example methods and apparatus described herein may be used by wireless terminals having TVWS connectivity capabilities in addition to capabilities for connecting to access network technologies other than IEEE® 802.11 WLAN access networks. Such other access network technologies may include both wireless and wired technologies such as cellular, Ethernet LAN and universal serial bus (USB), for example.

A dual-mode wireless terminal can be advantageously used to connect to a TVWS database via a non-TVWS access network (e.g., a WLAN access network or a cellular network) to retrieve information about TVWS access network connectivity capabilities/requirements/availability before attempting to connect to a TVWS access network. In this manner, if TVWS connectivity is not available or not possible, a wireless terminal need not consume battery power in attempting to connect to a TVWS access network when such an access network is not available or such a connection is not possible.

Turning now to FIG. 1, an example communication network 100 in which the example methods and apparatus described herein may be implemented is shown. As shown in FIG. 1, the example communication network 100 includes access networks (ANs) 102*a-b*, each having a respective access point (AP) 104*a-b*. In the illustrated example, the ANs 102*a-b* are TVWS ANs. As shown, the AN 102*a* provides wireless coverage to a geographic location (GEO-LOC) A 106*a*, and the AN 102*b* provides wireless coverage to a GEO-LOC B 106*b*. When a wireless terminal 108 is located in the GEO-LOC A 106*a*, the wireless terminal 108 can establish a connection with the AN 102*a*. When the wireless terminal 108 moves to the GEO-LOC B 106*b*, the wireless terminal 108 can establish a connection with the AN 102*b*.

To provide the wireless terminal 108 with AN connectivity information for establishing connections with the access networks 102*a-b*, the communication network 100 is provided with a network database 110, which is a TVWS database 110 in the illustrated example. The TVWS database 110 is shown located in an external network 112 that is logically external or separate from the ANs 102*a-b* and logically separate from any other access network through which wireless terminals connect to the TVWS database 108. Although not shown, the ANs 102*a-b* may connect with the external network 112 through another intermediate network (e.g., the Internet, a private network, etc.). In some example implementations, the TVWS database 110 may be distributed between different regions, with a hierarchy of databases that are managed and synchronized. In some example implementations, the ANs 102*a-b* or any other AN (e.g., a WLAN 116) may cache local copies of relevant portions (e.g., based on a limited geographical region) or all of the TVWS database 110.

As shown, the TVWS database 110 stores AN connectivity information 114, which includes AN connectivity information for establishing connections with the AN 102*a* and for the AN 102*b*. Access network connectivity information may include, for example, connection frequencies (e.g., frequency channels), available bandwidth, allowed transmission power, downlink transmission power availability, policies, locations, timing information, temporal range and/or geographic range of usage from a present position (e.g., based on protection contours stored in the TVWS database 110), and/or access rights to channels allocated for access network connectivity (e.g., connections with TVWS access networks). This information can be provided for different locations in which access networks (e.g., the access networks 102*a-b*) provide wireless coverage.

In the illustrated example of FIG. 1, the wireless terminal 108 may access the TVWS database 110 from either of the ANs 102*a-b* or from any other AN to retrieve access network connectivity information for either of the ANs 102*a-b* or any other AN. That is, the wireless terminal 108 can request AN connectivity information for any location (or all locations) to which it may be moved in the future even though the wireless terminal 108 is not presently in communication with an access network of that location. To retrieve relevant information, the wireless terminal 108 can predict its future locations based on any number of prediction factors (e.g., speed of travel, direction of travel, geographic map data, prior history, user input, web browser searches (e.g., map queries, travel direction search queries, etc.), etc.) and access the TVWS database 110 from any AN to retrieve AN connectivity information associated with connecting with any other AN, or maintaining a connection to the same AN, at the predicted future locations. In some example implementations, manual user input may also be used to provide the wireless terminal 108 with predicted future locations. Such manual user input may be advantageously used for instances in which the predicted future locations are relatively far from a current location such as in a different state or a different country or when the wireless terminal 108 is not expected to be located in such predicted future locations until the distant future (e.g., in the next few days, the next week, etc.).

In addition, the wireless terminal 108 may access the TVWS database 110 from any other type of AN different from a TVWS AN type used to implement the ANs 102*a-b* to request AN connectivity information for the ANs 102*a-b*. For example, the communication network 100 includes a WLAN access network 116 having a WLAN access point (AP) 118 that also provides access to the TVWS database 110 in the external network 112. In some example implementations, the wireless terminal 108 (e.g., implemented as a multi-mode wireless terminal) may predict that it will be located in GEO-LOC A 106*a* and GEO-LOC B 106*b* in the future and access the TVWS database 110 through the WLAN AN 116 to request AN connectivity information for connecting with the AN 102*a* and the AN 102*b*.

In the illustrated example of FIG. 1, the AN connectivity information for the AN 102*a* may be different from the AN connectivity information for the AN 102*b*. In particular, as shown in FIG. 1, the GEO-LOC B 106*b* may have licensed devices (LDs) 120 (e.g., licensed wireless microphones, TV broadcast stations, etc.) that use the same wireless spectrum (e.g., the same frequency channels) also used by the wireless terminal 108 to connect with the AN 102*b*. The LDs 120 can be registered with the TVWS database 110 so that the TVWS database 110 can notify other devices of which frequency channels the LDs 120 will be occupying for their operations at particular dates/times in the GEO-LOC B 106*b*. In this manner, the TVWS database 110 can inform mobile communication devices such as the wireless terminal 108 that such frequency channels are not available for use in the GEO-LOC B 106*b* during the registered dates/times. Thus, if the wireless terminal 108 is using a frequency channel in the GEO-LOC A 106a that is restricted or unavailable in the GEO-LOC B 106b (due to operation of one or more of the LDs 120), the wireless terminal 108 must change its AN connection configuration when it moves into the GEO-LOC B 106b and its wireless connection is handed off from the AN 102a to the AN 102b.

In some example implementations, AN connectivity information retrieved from the TVWS database 110 may also include temporal range and/or geographic range of usage to indicate a duration (e.g., a temporal range) for which or an area (e.g., a geographic range) in which the AN connectivity information is valid for use. In some instances, the temporal range and/or geographic range may indicate that the AN connectivity information is valid for use in one AN or over a span of several ANs. Temporal range of usage for AN connectivity information may be more relevant for fixed wireless terminals or wireless terminals that do not move very often, while geographic range of usage may be more relevant to mobile wireless terminals that move relatively more often between different locations. Such temporal and/or geographic range of usage may be advantageously used by the wireless terminal 108 to prioritize selected AN connectivity configurations or identify preferred AN connectivity configurations. For example, if the wireless terminal 108 is subject to a substantial amount of travel (e.g., travel by car on a highway), the wireless terminal 108 may prioritize a preference to have a uniform or same channel selection to prevent the need to perform frequent channel changeovers or handovers when traveling between different ANs based on a geographic range. If the wireless terminal 108 is subject to a near stationary state (e.g., the wireless terminal 108 experiences very little or no change in location as may be the case when the wireless terminal 108 is carried by a pedestrian while walking) or short range mobility (e.g., during indoor usage of the wireless terminal 108), the wireless terminal 108 may prioritize a preference to have the longest duration channel selection (e.g., select a channel that may remain selected for the longest duration) to prevent the need to perform frequent channel changeovers or handovers during the duration of a connection session with a current AN or a group of ANs based on a temporal range.

Although not shown, the ANs 102a-b and 116 may also be provided with network access servers (NASs) in communication with respective APs 104a-b and 118. In such example implementations, the NASs may be used to determine whether wireless terminals are permitted to gain network access and, thus, communicate with the ANs 102a-b and 116 and other networks (e.g., the external network 112). In addition, NASs may process communications sent by the wireless terminal 108 to the APs 104a-b and 118 intended for delivery to the TVWS database 110 and forward such communications or related portions (e.g., IEEE® 802.11 Information Elements used with an Access Network Query Protocol to form TVWS protocol (TVWSP) frames) to the TVWS database 110. In addition, the NASs may be used to receive responses from the TVWS database 110 and forward the response information (e.g., via TVWSP frames) to the wireless terminal 108 through respective ones of the APs 104a-b and 118.

Figure 14:
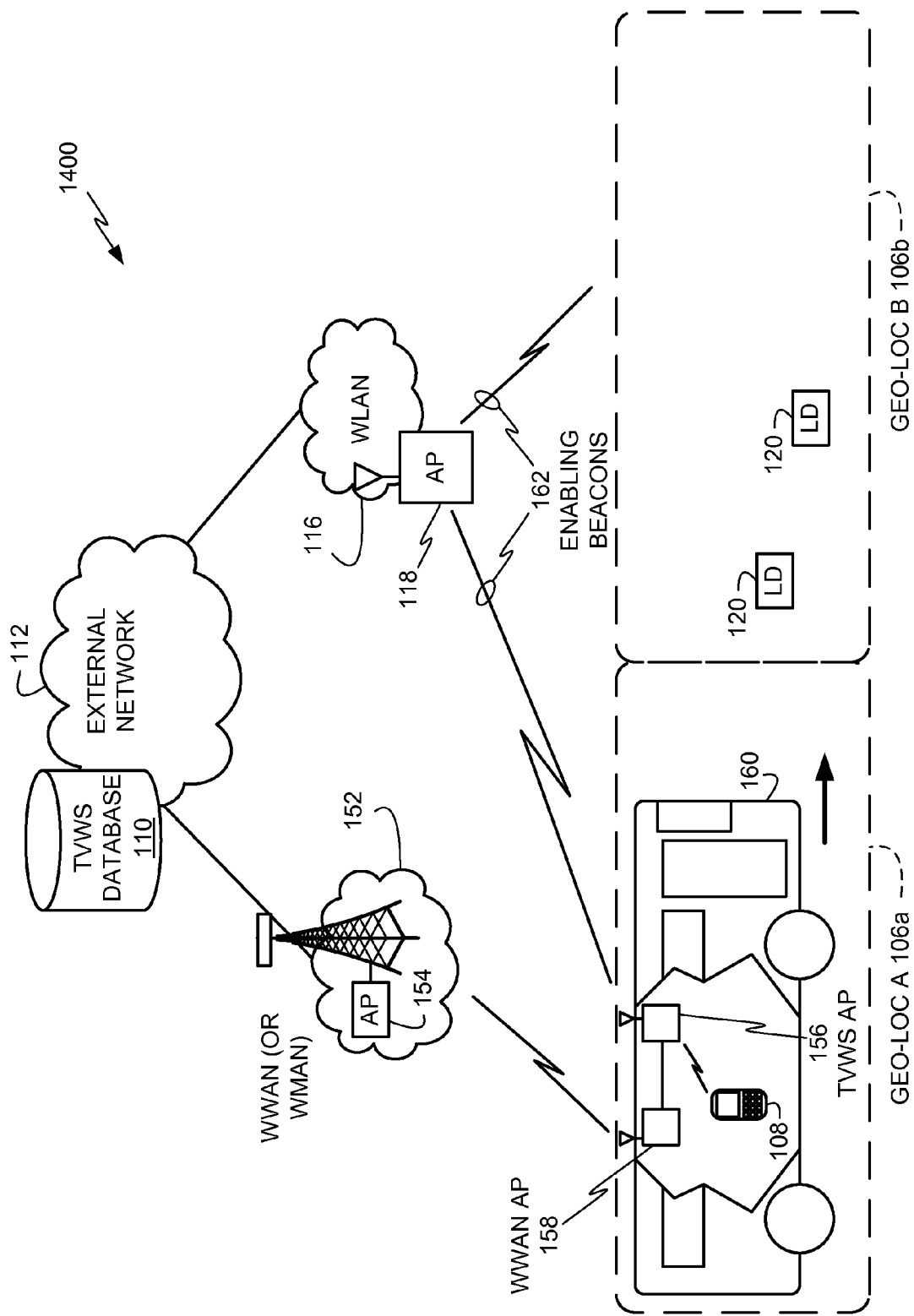
FIG. 14 depicts another example communication network in connection with a mobile AN.

Turning briefly to FIG. 14, the example methods and apparatus described herein may also be implemented in connection with mobile ANs that are moved between different geographic locations (e.g., the GEO-LOCs A-B 106a-b). In the illustrated example of FIG. 14, the wireless terminal 108 is shown in another example network system 1400 having some elements in common with the network system 100 of FIG. 1 and may be implemented in connection with the network system 100, in some example implementations. The network system 1400 is shown as having an AN 152 including an AP 154. The AN 152 may be a wireless wide area network (WWAN), a wireless metropolitan area network (WMAN), a WiMAX AN, a Long Term Evolution (LTE) AN, or any other type of AN that is in communication with the external network 112 and capable of communicating with mobile devices and mobile APs.

In the illustrated example, the wireless terminal 108 is shown in communication with a mobile TVWS AP 156 forming a mobile TVWS AN. To access the external network 112 or any other network (e.g., the Internet), the mobile TVWS AP 156 is in communication with a mobile WWAN AP 158 which, in turn, is in communication with the AP 154 of the AN 152. In the illustrated example, the conveyance vehicle for the wireless terminal 108, the mobile TVWS AP 156 and the mobile WWAN AP 158 is a bus 160, but may be any other type of vehicle including, for example, an automobile, a person (e.g., a person carrying a portable device forming an ad-hoc AP), etc.

In the illustrated example, the mobile TVWS AP 156 may be provided with a WLAN radio to communicate with the WLAN AP 118. During operation, an enabling AP such as the WLAN AP 118 transmits enabling beacons 162 that, when detected and decoded by the TVWS AP 156 cause the TVWS AP 156 to access the external network 112 via the mobile WWAN AP 158. The mobile TVWS AP 156 may query the TVWS database 110 through the WWAN AP 158 requesting TVWS channel availability information as described herein for a present actual location (e.g., the GEO-LOC A 106a) in which the bus 160 is located and/or any predicted future locations (e.g., the GEO-LOC A 106b) in which the bus 160 may be located in the future. The TVWS AP 156 may locally store the received TVWS channel availability information, and the wireless terminal 108 may request the TVWS channel availability information from the TVWS AP 156 to establish a non-interfering connection with the TVWS AP 156.

As the wireless terminal 108, the mobile TVWS AP 156, and the mobile WWAN AP 158 move between different locations, they may cross protection contours associated with the operations of primary devices (e.g., licensed, registered devices of white space channels), such as the LDs 120, located at those different locations. During such movement, the mobile TVWS AP 156 can query the TVWS database 110 for updated TVWS channel availability information for approaching locations and send the TVWS channel availability information to the wireless terminal 108 to enable the wireless terminal 108 to maintain valid AN connections through the mobile TVWS AP 156 even though they are traversing areas in which protections are enforced for primary devices (e.g., the LDs 120). Thus, even though the wireless terminal 108 and the mobile TVWS AP 156 move between different protection contours they can remain in communication with one another without interfering with nearby primary devices by using TVWS channel availability information received from the TVWS database 110.

In the illustrated example, when the mobile TVWS AP 156 is in GEO-LOC A 106a and moving toward GEO-LOC B 106b, the TVWS AP 156 may query the TVWS database 110 to request updated TVWS channel availability information for the GEO-LOC B 106b and determine the available channels in that new location. If the channel selected for a current location (e.g., GEO-LOC A 106a) is no longer available in the approaching new location (GEO-LOC B 106b), the TVWS AP 156 selects a channel that is available in the new location and instructs all of its attached wireless terminals (e.g., the wireless terminal 108) to change the configurations of their AN connections with the TVWS AP 156 to use the new channel. In the illustrated example, the TVWS AP 156 can continue to provide TVWS network coverage to wireless terminals as long as it receives the enabling beacons 162 from the WLAN AP 118.

Figure 2:
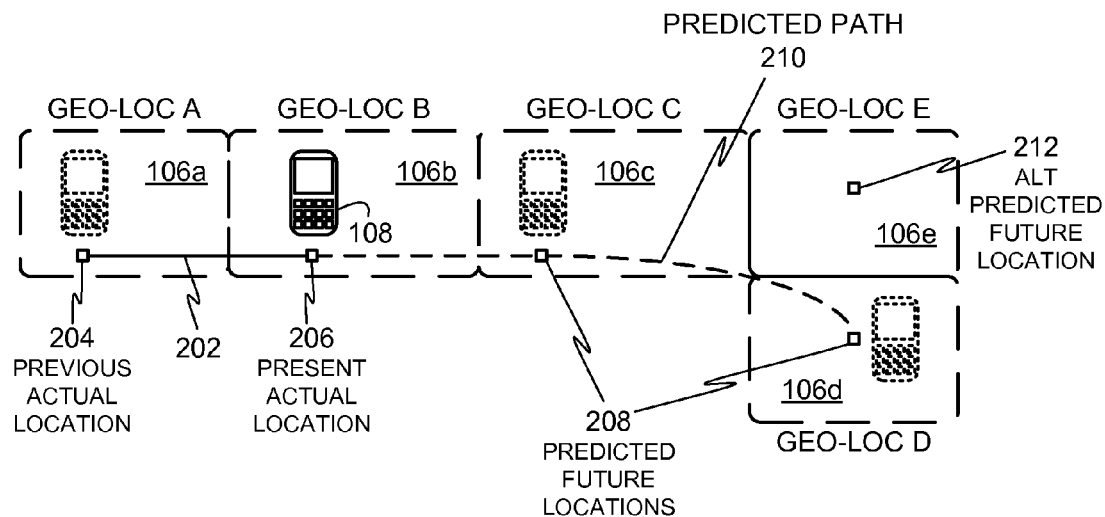
FIG. 2 depicts the wireless terminal of FIG. 1 predicting future locations for use in retrieving AN connectivity information for connecting to the access networks of FIG. 1.

Turning now to the illustrated example of FIG. 2, the wireless terminal 108 of FIG. 1 predicts future locations (e.g., near-future locations along a current path of travel 202) for use in retrieving AN connectivity information for connecting to the ANs 102*a-b* of FIG. 1. The current path of travel 202 includes a previous actual location 204 (in the GEO-LOC A 106*a*) and a present actual location 206 (in the GEO-LOC B 106*b*) of the wireless terminal 108. In the illustrated example, the wireless terminal 108 may be provided with a global positioning system (GPS) device or other location awareness technology to determine the current path of travel 202, the previous actual location 204 and the present actual location 206. In some example implementations, the wireless terminal 108 may send its present actual location 206 to the TVWS database 110 of FIG. 1, and the TVWS database 110 may use the present actual location 206 (e.g., a location in the GEO-LOC B 106*b*) to determine the geo-physical range of each frequency channel that is presently available to the wireless terminal 108 for connecting to, for example, the AN 102*b* (FIG. 1) of the GEO-LOC B 106*b*. Thus, the TVWS database 110 may perform the function of geographic prediction based on information provided by the wireless terminal 108.

The wireless terminal 108 may use prediction factors to determine predicted future locations 208 at which the wireless terminal 108 predicts it will be located in the future (e.g., the near future). Prediction factors may include, for example, the previous actual location 204 (and/or other previous actual locations), the present actual location 206, speed of travel, direction of travel, and/or any other information that may be used to predict future locations. Any known and suitable techniques for predicting the predicted future locations 208 may be employed, including manual user input of future locations. In some example implementations, by comparing predictions with periodic sample readings of actual locations, the accuracy of subsequent predictions can be improved.

In addition, the wireless terminal 108 may use speed of travel and direction of travel information to determine how often it needs to check-in with or request updated AN connectivity information from the TVWS database 110. For example, if the wireless terminal 108 is moving relatively slowly or not moving at all, the wireless terminal 108 may determine that it needs to check-in (e.g., request AN connectivity information) with the TVWS database 110 less often than if it were moving relatively faster and, thus, traversing different locations (e.g., the GEO-LOCs A-B 106*a-b* of FIGS. 1 and 2) served or covered by different ANs (e.g., the AN's 102*a-b* of FIG. 1). In some example implementations, when the wireless terminal 108 goes beyond a temporal range or geographic range of usage for a particular channel, the wireless terminal 108 may be triggered to re-request relevant AN connectivity information from the TVWS database 110.

As shown in FIG. 2, predicted paths of travel may follow non-linear paths such as predicted path 210. Such non-linear path predictions may be facilitated through the use of map data showing available paths of travel matching current paths of travel of mobile devices (e.g., the current path of travel 202 of the wireless terminal 108). For example, if the current path of travel 202 follows an interstate highway that follows one or more bends, such bends in the available path of travel for the wireless terminal 108 may be identified from map data indicative of the same. Although the predicted path 210 is shown in FIG. 2, the disclosed example methods and apparatus may be implemented using less granular predictions such that relatively few locations forming the predicted path 210 are predicted. In some example implementations, the wireless terminal 108 (or a network device) may predict the predicted future locations 208 without predicting paths (e.g., the predicted path 210) between the predicted future locations 208.

In the illustrated examples described herein, the wireless terminal 108 may use the predicted future locations 208 to request AN connectivity information from the TVWS database 110 (FIG. 1) for ANs providing wireless coverage at the predicted future locations 208. In this manner, the wireless terminal 108 can maintain AN connectivity with those ANs when the wireless terminal 108 is moved to the predicted locations 208.

In the illustrated example, the wireless terminal 108 also predicts an alternative predicted future location 212. For example, the alternative predicted future location 212 may be a viable choice if the wireless terminal 108 determines that there are two possible routes (e.g., a route in GEO-LOC D 106*d* and another route in GEO-LOC E 106*e*) for travel when leaving the GEO-LOC C 106*c*. In such instances, the wireless terminal 108 may request AN connectivity information from the TVWD database 110 from alternative predicted future locations (e.g., the alternative predicted future location 212) in addition to predicted future locations (e.g., the predicted future locations 208) to which the wireless terminal 108 is more likely to travel or equally likely to travel.

In some example implementations, the TVWS database 110 (or a server associated therewith) may use predicted locations (e.g., the predicted locations 208) or other information (e.g., prediction factors) sent to it by wireless terminals to predict future connections with different wireless terminals. The TVWS database 110 may provide forecasts of connection loads to different ANs (e.g., the ANs 102*a-b* of FIG. 1) to inquiring wireless terminals, and the wireless terminals may use such connection load forecasts to select a travel route for a user to follow that would result in connecting to relatively lesser congested ANs.

Figure 3:
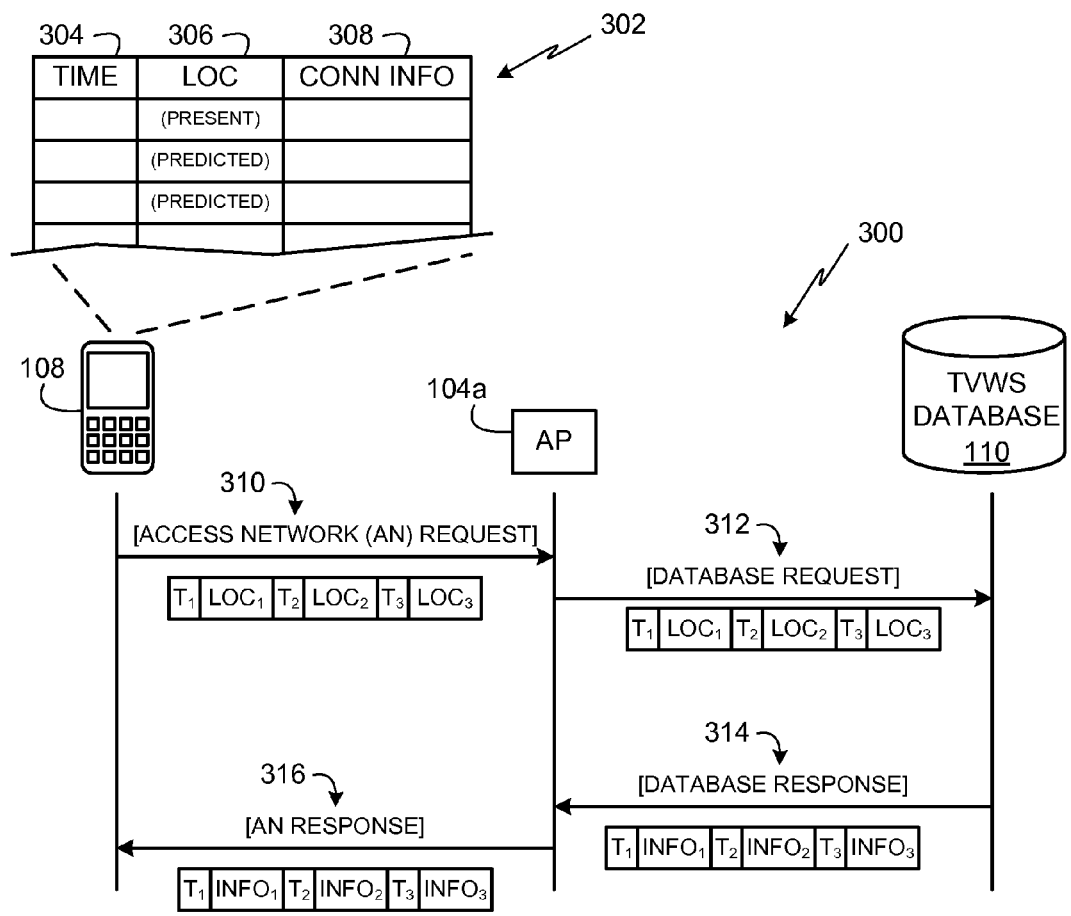
FIG. 3 depicts example message exchanges between the wireless terminal, an access point, and the TVWS database of FIG. 1 for requesting AN connectivity information from the TVWS database.

Turning to FIG. 3, the wireless terminal 108 may use the predicted locations 208 of FIG. 2 in connection with example message exchanges 300 between the wireless terminal 108 (FIGS. 1 and 2), the AP 104*a*, and the TVWS database 110 of FIG. 1 to request AN connectivity information from the TVWS database 110. For example, after predicting a path of travel including the predicted locations 208, the wireless terminal 108 may request AN connectivity information sets corresponding to the predicted locations 208 for connecting to ANs providing wireless communication coverage along the predicted path of travel at the predicted locations 208.

As shown in FIG. 3, the wireless terminal 108 may store a predicted connectivity data structure 302 used to store time entries 304, location entries 306, and AN connectivity information sets 308 for each predicted location (e.g., the predicted locations 208) of the wireless terminal 108. Each of the time entries 304 indicates a time at which the wireless terminal 108 will arrive at a corresponding predicted location (e.g., one of the predicted future locations 208 of FIG. 2), each of the location entries 306 indicates an identifier of a corresponding predicted future location (e.g., one of the predicted future locations 208), and each of the AN connectivity information sets 308 stores AN connectivity information pertaining to a respective predicted future location at a corresponding future time (e.g., one of the time entries 304). In the illustrated example of FIG. 3, when the wireless terminal 108 detects that it is actually located in a location identified by a predicted future location in the location entries 306, the wireless terminal 108 may change its current AN connection based on a corresponding one of the AN connection information sets 308, if the current AN connection (or AN connection configuration) is no longer available. For example, if the wireless terminal 108 is on a current AN connection using channel 5 and subsequent AN connectivity information for a predicted future location allows the use of channel 5 (in addition to the use of other channels), then the wireless terminal 108 need not change the configuration of its current AN connection when it arrives at the predicted future location because the AN connectivity information for the predicted future location allows the use of channel 5, which is already being used by the wireless terminal 108 for its already established AN connection. However, if the AN connectivity information for the predicted future location does not allow the use of channel 5, then the wireless terminal 108 can change or adjust its AN connection to use a different channel as allowed according to the AN connectivity information of the predicted future location.

To retrieve AN connectivity information from the TVWS database 110, the wireless terminal 108 sends an access network (AN) request message 310 to query the TVWS database 110 through the AP 104a. In the illustrated example, the AN request message 310 includes predicted times ($T_1$-$T_3$) and respective predicted future locations ($LOC_1$-$LOC_3$) from the predicted connectivity data structure 302. The predicted times ($T_1$-$T_3$) and respective predicted future locations ($LOC_1$-$LOC_3$) in the AN request message 310 indicate that the wireless terminal 108 is requesting AN connectivity information that is valid for the indicated locations ($LOC_1$-$LOC_3$) at the indicated times ($T_1$-$T_3$). In the illustrated example, the indicated location $LOC_1$ may be indicative of a GEO-LOC C 106c of FIG. 2 and the indicated location $LOC_2$ may be indicative of a GEO-LOC D 106d of FIG. 2. Upon receiving the AN request message 310, the AP 104a sends a database request 312 to the TVWS database 110 forwarding the times ($T_1$-$T_3$) and respective predicted future locations ($LOC_1$-$LOC_3$) from the AN request 310.

In the illustrated example, the TVWS database 110 responds to the database request 312 with a database response message 314 that includes the requested AN connectivity information sets ($INFO_1$-$INFO_3$) along with the corresponding predicted times ($T_1$-$T_3$). In the illustrated example, the AN connectivity information set $INFO_1$ includes connectivity information for connecting to an AN (e.g., similar to the ANs 102a-b of FIG. 1) at the GEO-LOC C 106c of FIG. 2 at or around the predicted time $T_1$ and the AN connectivity information set $INFO_2$ includes connectivity information for connecting to an AN of a GEO-LOC D 106d of FIG. 2 at or around the predicted time $T_2$. After receiving the database response 314, the AP 104a sends an AN response message 316 to the wireless terminal 108 including the requested AN connectivity information sets ($INFO_1$-$INFO_3$) along with the corresponding times ($T_1$-$T_3$) from the database response 314.

In some example implementations, the predicted times ($T_1$-$T_3$) may be omitted from the database response 314 and the AN response 316 and the wireless device 108 can assume that the ordering of the requested AN connectivity information sets ($INFO_1$-$INFO_3$) in the AN response 316 corresponds to the ordering of the times ($T_1$-$T_3$) in the AN request 310 to match each of the requested AN connectivity information sets ($INFO_1$-$INFO_3$) to a respective one of the times ($T_1$-$T_3$) and a respective one of the locations ($LOC_1$-$LOC_2$).

In some example implementations, the TVWS database 110 may modify the predicted times ($T_1$-$T_3$) and the predicted future locations ($LOC_1$-$LOC_3$) to times and locations that indicate better time/location points at which requested AN connectivity information sets change. For example, the predicted time $T_1$ provided by the wireless terminal 108 may be temporally near a time-based change boundary (e.g., $T_{1'}$) for a corresponding AN connectivity information set $INFO_1$ such that the wireless terminal 108 would immediately or relatively quickly need to change its AN connection in accordance with an updated AN connectivity information set $INFO_{1'}$ after having arrived at a corresponding location $LOC_1$ at the predicted time $T_1$. Additionally or alternatively, the predicted location $LOC_1$ provided by the wireless terminal 108 may be geographically near a location-based change boundary (e.g., $LOC_{1'}$) for a corresponding AN connectivity information set $INFO_1$ such that the wireless terminal 108 would immediately or relatively quickly need to change its AN connection in accordance with an updated AN connectivity information set $INFO_{1'}$ after having arrived at the location $LOC_1$ at the predicted time $T_1$. Thus, to avoid such frequent changes in AN connections, the TVWS database 110 can provide one or more recommended or suggested AN connectivity information sets ($INFO_1'$-$INFO_3'$) in the database response 314 corresponding to one or more of the modified predicted times (T1'-T3') and one or more of the modified predicted future locations (LOC1'-LOC3').

In some example implementations, to provide some tolerance or allowances on the predicted times ($T_1$-$T_3$), the TVWS database 110 may respond to the database request 312 by providing two or more AN connectivity information sets in the database response message 314 for each of the predicted times ($T_1$-$T_3$). For example, multiple AN connectivity information sets (e.g., $INFO_{1(-1)}$, $INFO_{1(0)}$, $INFO_{1(1)}$ for the predicted time $T_1$ may correspond to valid AN connectivity information ($INFO_{1(-1)}$) demarked by a time boundary ($T_{1(-1)}$) occurring prior to the predicted time $T_1$, valid AN connectivity information ($INFO_{1(0)}$) during the predicted time ($T_1$), and valid AN connectivity information ($INFO_{1(1)}$) demarked by a time boundary ($T_{1(1)}$) occurring after the predicted time $T_1$. In this manner, if the temporal trajectory of the wireless terminal 108 along a predicted path changes, the wireless terminal 108 can use the multiple AN connectivity information sets (e.g., $INFO_{1(-1)}$, $INFO_{1(0)}$, $INFO_{1(1)}$) received for each subsequent predicted future location based on the adjusted time (e.g., $T_{1(-1)}$) or $T_{1(1)}$) at which the wireless terminal 108 arrived at that subsequent predicted future location.

Additionally or alternatively, the wireless terminal 108 may re-request AN connectivity information updates from the TVWS database 110 using the AN request message 310 each time it updates the predicted times ($T_1$-$T_3$) and the predicted times ($T_1$-$T_3$) change by a sufficient amount (e.g., due to increases or decreases in travel speed of the wireless terminal 108) such that the wireless terminal 108 predicts it will arrive at the predicted future locations ($LOC_1$-$LOC_3$) at different times associated with different AN connectivity information than previously received (e.g., different from the previously received AN connectivity information sets ($INFO_1$-$INFO_3$)). To enable the wireless terminal 108 to detect when it should retrieve updated AN connectivity information sets ($INFO_1$-$INFO_3$), the TVWS database 110 may enforce a standardized time or duration threshold. In this manner, when a change in one or more of the predicted times ($T_1$-$T_3$) changes by more than the duration threshold, the wireless terminal 108 may request one or more corresponding updated AN connectivity information sets. Such time or duration threshold may be a fixed threshold value applied to all predicted times or the TVWS database 110 may generate time or duration thresholds that are specific to each AN connectivity information set based on registration information in the TVWS database 110. The TVWS database 110 may communicate such specific time or duration thresholds to the wireless terminal 108 in the database response message 314 in connection with respective ones of the AN connectivity information sets (INFO$_1$-INFO$_3$).

The AN request message 310 and the AN response message 316 may be implemented using Generic Advertisement Service (GAS) query/response formatted frames. The GAS protocol, as defined in IEEE® 802.11, provides transport mechanisms for advertisement services between the wireless APs and wireless terminals while the wireless terminals are in a non-associated state (or an associated state) with the wireless APs.

Figure 4:
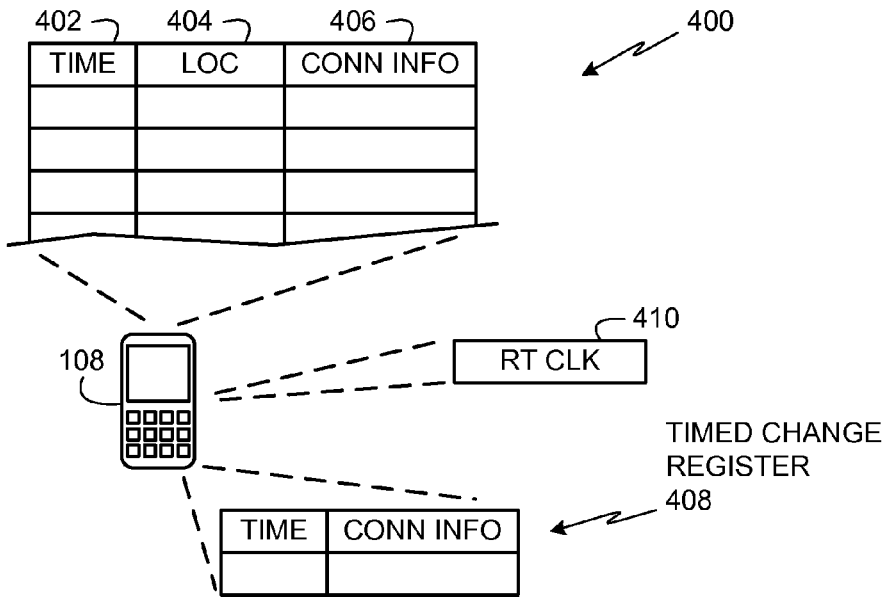
FIG. 4 depicts an example implementation of the wireless terminal of FIG. 1 that may be used to make changes to connectivity between the wireless terminal and an access network based on timing information indicating the start of enforcing new AN connectivity information.

FIG. 4 depicts an example implementation of the wireless terminal 108 (FIGS. 1-3) that may be used to make changes to connectivity between the wireless terminal 108 and an AN (e.g., one of the ANs 102a-b of FIG. 1) based on timing information indicating the start of enforcing new AN connectivity information. The example implementation of FIG. 4 may be used in instances in which the wireless terminal 108 is mobile and/or when it is implemented as a stationary device at a fixed location. Predicting changes in AN connectivity information based on timing information (e.g., times of day or count-down times at which the changes will take effect) enables the wireless terminal 108 to implement the changes without determining or taking a reading of its location. This may be advantageously used to reduce the overall processing activity of the wireless terminal 108 during the moments approaching the changes in the AN connectivity information (e.g., Regulatory Class changes). In addition, communicating such predicted changes to other devices (e.g., TV transmitters and other TVBDs) may facilitate proper operation of co-located devices operating within the same or neighboring frequency channels.

In the illustrated example, the wireless terminal 108 stores a time-based connectivity information data structure 400 that stores time entries 402 and corresponding AN connectivity information sets 406. The time entries 402 indicate times at which their respective AN connectivity information sets 406 start to be enforced by one or more respective ANs (e.g., the AN 102a-b). Alternatively, the time entries 402 may contain count-down times or durations remaining before respective AN connectivity changes become effective. In the illustrated example, the time-based connectivity information data structure 400 also includes location entries 404 (e.g., similar to the location entries 306 of FIG. 3) corresponding to respective ones of the time entries 402 and AN connectivity information sets 406.

In the illustrated example, the wireless terminal 108 is provided with a timed change register 408 and a real-time clock 410. The wireless terminal 108 can use the timed change register 408 to load one of the time entries 402 and corresponding AN connectivity information sets 406 that is next-in-time or is about to start being enforced by corresponding ANs (e.g., the ANs 102a-b of FIG. 1). The wireless terminal 108 uses the real-time clock 410 to trigger a time event when a time value of the real-time clock 410 matches a time value in the timed change register 408. In response to the time event, the wireless terminal 108 implements an AN connectivity change to enable an AN connection based on the requirements of the AN connectivity information set stored in the timed change register 408. In example implementations in which the time entries 402 correspond to count-down times (e.g., remaining times prior to upcoming AN connectivity information changes becoming effective), a counter may be used instead of the real-time clock 410 to detect when the wireless terminal 108 should implement AN connection changes based on corresponding ones of the AN connection information sets 406.

In some example implementations, the location entries 404 may be used to update or re-calculate subsequent predicted times in the time entries 402 based on actual locations (e.g., the previous actual location 204 and the present actual location 206 of FIG. 2) of the wireless terminal 108 along its path of travel. For example, subsequent predicted times in the time entries 402 may be offset or incorrect if the wireless terminal 108 is delayed in reaching predicted future locations indicated in the location entries 404. In response to such delays, the wireless terminal 108 may update subsequent predicted times in the time entries 402 to obtain valid updated AN connectivity information for the updated predicted times at corresponding locations. The wireless terminal 108 may retrieve such valid updated AN connectivity information at times and locations prior to requiring AN connection changes and that are convenient based on some criteria to, for example, avoid significant communication exchanges between the wireless terminal 108 and a network temporally near to the time that an AN connection change should be implemented.

In some example implementations, the wireless terminal 108 may use the AN connectivity information in the time-based connectivity information data structure 400 to change AN connection configurations based on detected current locations of the wireless terminal 108 rather than based on the time information in the time entries 402. For example, if the wireless terminal 108 detects (e.g., using a GPS device or other location detection technique) that it has arrived at a predicted future location indicated in the location entries 404 but a current time has not yet reached the predicted time indicated in a corresponding one of the time entries 402, the wireless terminal 108 may change its AN connection configuration based on having arrived at the predicted future location even though the predicted time information in the corresponding time entry 402 does not match a current time. The wireless terminal 108 can then proceed to update its subsequent predicted times in the time entries 402 and subsequent predicted locations in the location entries 404 and retrieve updated valid AN connectivity information from the TVWS database 110 for the updated times and locations.

Figure 5:
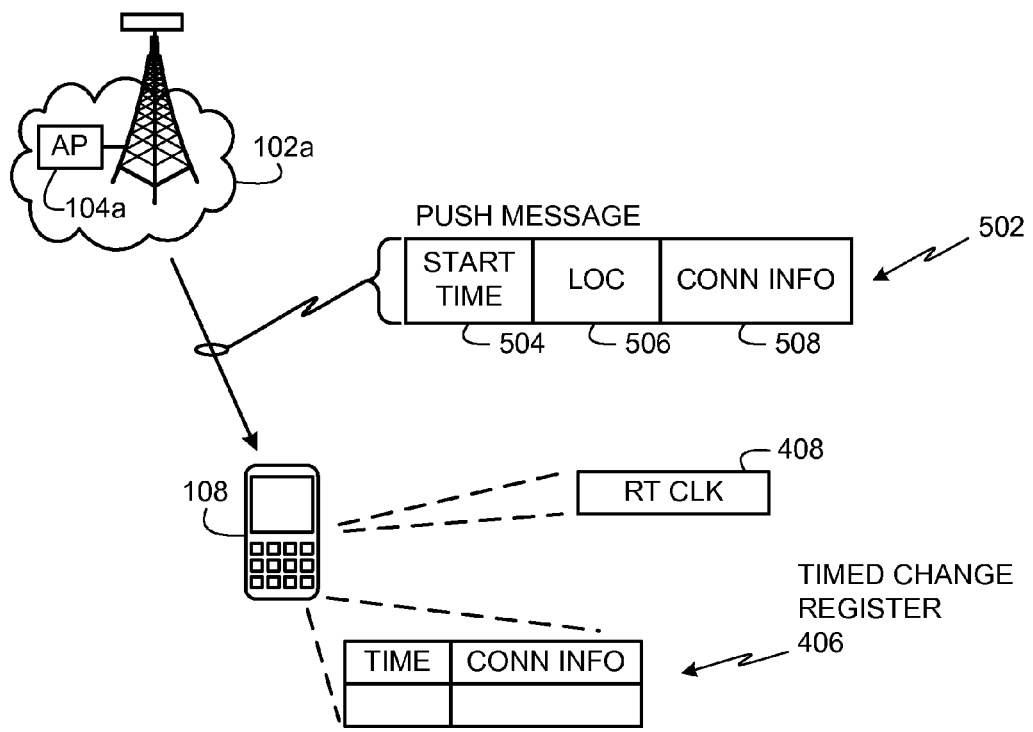
FIG. 5 depicts an example communication technique for pushing AN connectivity information to the wireless terminal of FIG. 1.

FIG. 5 depicts an example communication technique for pushing AN connectivity information to the wireless terminal 108 (FIGS. 1-4). The example communication technique of FIG. 5 may be used in instances in which the wireless terminal 108 is mobile and/or when it is implemented as a stationary device at a fixed location. As shown, the AN 102a pushes a message 502 addressed or directed to the wireless terminal 108 including a start time 504, a location 506, and an AN connectivity information set 508. In some example implementations, the location 506 may be omitted if the AN connectivity information set 508 corresponds to a present actual location (e.g., the present actual location 206 of FIG. 2) of the wireless terminal 108. In the illustrated example, the AN connectivity information set 508 includes information about upcoming AN connectivity information changes and is based on the AN connectivity information 114 in the TVWS database 110 (FIG. 1) (or a local proxy database at the AN). For example, a network device (e.g., the APs 104a-b, the WLAN AP 118, associated NASs, and/or the TVWS database 110 of FIG. 1) may detect a present actual location (e.g., the present actual location 206) of the wireless terminal 108 and/or may collect location prediction parameters from the wireless terminal 108 and/or other sources and predict the future locations (e.g., the predicted future locations 208 of FIG. 2) of the wireless terminal 108. The network device may then push AN connectivity information via the push message 502 corresponding to the present actual location 206 and/or the predicted future locations 208 to the wireless terminal 108.

In some example implementations, the push message 502 may include information about the positions of individual licensed devices (e.g., wireless microphones) registered to use one or more frequency channels otherwise available to the wireless terminal 108. In other example implementations, the push message 502 may indicate frequency channels no longer available for use by TVBDs such as the wireless terminal 108 or that will once again be available after not previously being available for use due to use by other registered licensed devices (e.g., wireless microphones). The push messages 502 may be triggered for transmission by the TVWS database 110 based on a change in the TVWS database 110 associated with radio environment configurations, device registrations, device density, etc. For example, information in the TVWS database 110 may change in response to a time change (e.g., certain AN connection configurations are allowed or restricted during certain times) or in response to one or more licensed devices (e.g., the LDs 120 of FIG. 1) operating or ceasing operation in a particular location.

The start time 504 indicates a remaining time prior to the upcoming AN connectivity information changes becoming effective or a time of day at which the changes become effective. The wireless terminal 108 can use such time-based information to implement the Regulatory/Operating Class changes in the AN connectivity information set 508 as required, and thus, reduce the overall activity (e.g., communication activity, location determination activity, etc.) of the wireless terminal 108 at the moment of the Regulatory Class change by relying on the time-based information to make such changes.

The push message 502 can be pushed down to the wireless terminal 108 from the TVWS database 110 during or after a connection initialization session (e.g., registration, initial query time), at regular intervals (e.g., once every hour), or when an event occurs in the TVWS database 110 (e.g., a concert venue will require the use of wireless microphones or has ended its use of wireless microphones). In some example implementations, the AP 104a of the AN 102a may filter AN connectivity information changes based on actual locations (e.g., the present actual location 206 of FIG. 2) or predicted future locations (e.g., the predicted future locations 208 of FIG. 2) of the wireless terminal 108 to ensure that only relevant AN connectivity information is pushed to the wireless terminal 108 for its predicted route, and thus, avoid unnecessary data transmissions. The pushing of relevant AN connectivity information corresponding to the predicted route of the wireless terminal 108 may be performed by a server in the network (e.g. as an associated function of a local database or NAS of the AP 104a, a third-party proxy within the AN 102a, etc.) that has been informed of the predicted route.

In the illustrated example of FIG. 5, the wireless terminal 108 may use the timed change register 408 and the real-time clock 410 in a manner as described above in connection with FIG. 4 to implement AN connectivity changes based on the AN connectivity information 508 and the start time 504 received in the push message 502.

Figure 6:
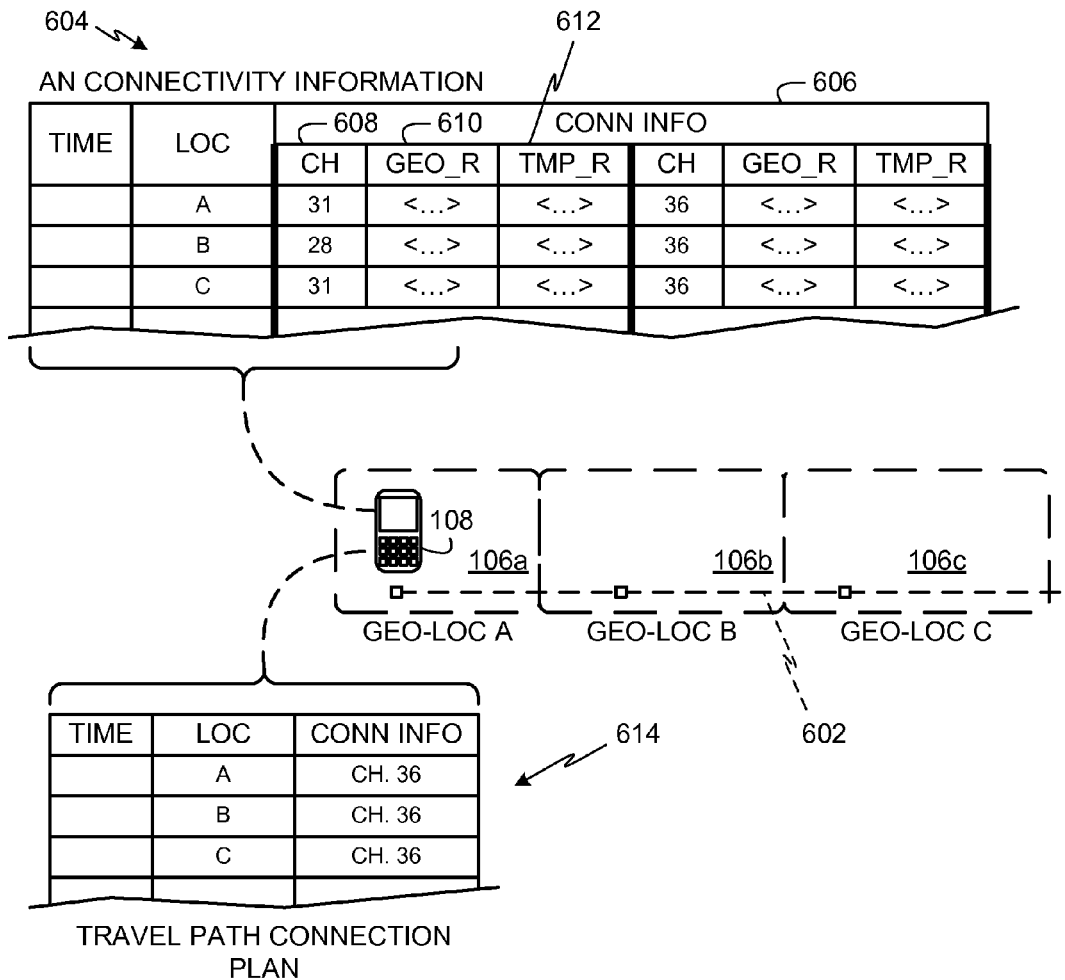
FIG. 6 depicts the wireless terminal of FIG. 1 using an AN connection configuration selection technique to establish an AN connection configuration requiring the relatively fewer, lesser, or least amounts or quantities of AN connection configuration changes while traveling between different geographic locations associated with different AN connectivity requirements.

FIG. 6 depicts the wireless terminal 108 (FIGS. 1-5) using an AN connection configuration selection technique to establish an AN connection configuration requiring relatively fewer, lesser, or least amounts or quantities of AN connection configuration changes while the wireless terminal 108 travels between different geographic locations associated with different AN connectivity requirements. In the illustrated example, the AN connection configuration selection is associated with selecting a channel that will require relatively fewer or lesser (e.g., the least) amounts of changes when the wireless terminal 108 is moved between the GEO-LOCs A-C 106a-c.

In the illustrated example of FIG. 6, the wireless terminal 108 predicts a predicted path of travel 602 that traverses the GEO-LOCs A-C 106a-c. In other example implementations, the predicted path of travel 602 may be predicted by a network device (e.g., a NAS of one of the ANs 102a-b of FIG. 1, a third-party proxy within an AN, or the TVWS database 110 of FIG. 1). The wireless terminal 108 stores an AN connectivity information data structure 604 in which it stores predicted future locations along the predicted path of travel 602 and corresponding AN connectivity information sets 606 received from the TVWS database 110 of FIGS. 1 and 3. In the illustrated example, the AN connectivity information sets 606 for the GEO-LOCs A-C 106a-c define a device protection contour along the predicted path 602 to protect other registered licensed devices (e.g., the LDs 120 of FIG. 1) from interference caused by wireless terminals, such as the wireless terminal 108, sharing the same frequency spectrum with the registered licensed devices.

In the illustrated example of FIG. 6, the AN connectivity information sets 606 for the GEO-LOCs A-C 106a-c include channel identifiers 608 and corresponding geographic range information (GEO_R) 610 and temporal range information (TMP_R) 612 for each of the channel identifiers 608. The geographic range information (GEO_R) 610 specifies a distance or area of usage based on a corresponding predicted future location (e.g., based on protection contours stored in the TVWS database 110) in which a corresponding channel is available or valid for use. The geographic range information (GEO_R) 610 may be provided by the TVWS database 110 in the AN connectivity information sets ($INFO_1$-$INFO_3$) for corresponding predicted future locations ($LOC_1$-$LOC_3$) as described above in connection with FIG. 3. The temporal range information (TMP_R) 612 specifies a duration (e.g., based on protection contours stored in the TVWS database 110) during which a corresponding channel is available or valid for use. The temporal range information (TMP_R) 612 may be provided by the TVWS database 110 in the AN connectivity information sets ($INFO_1$-$INFO_3$) for corresponding predicted times ($T_1$-$T_3$) as described above in connection with FIG. 3.

As shown in the AN connectivity information data structure 604, the GEO-LOC A 106a is shown as allowing use of channels 31 and 36, the GEO-LOC B 106b is shown as allowing use of channels 28 and 36, and the GEO-LOC C 106c is shown as allowing use of channels 31 and 36. Using the predicted path 602, the wireless terminal 106 may select one or more channel(s) that will require the fewest changes over the course of travel via the predicted path 602 (or over a particular duration), thus reducing or minimizing AN connection configuration changes during an AN connection session. The wireless terminal 108 may form AN connection configurations for each of the GEO-LOCs A-C 106a-c and store the AN connection configurations in a travel path connection plan data structure 614. Such channel selection(s) may be determined by the wireless terminal 108 based on, for example, the geographic range information (GEO_R) 610 and/or the temporal range information (TMP_R) 612 for each channel. Alternatively, the wireless terminal 108 may be instructed by a network entity (e.g., a NAS of one of the ANs 102a-b of FIG. 1, a third-party proxy within an AN, or the TVWS database 110 of FIG. 1) to select a particular channel. In some example implementations, the TVWS database 110 may send the wireless terminal 108 only channels that have the longest geographic range (GEO_R) and/or the longest temporal range (TMP_R) to facilitate selection by the wireless terminal 108 of one or more channel(s) that will require the fewest changes over the course of travel via the predicted path 602 or over a particular duration.

In the illustrated example, the wireless terminal 108 may select to use channel 36 to maintain an AN connection in each of the GEO-LOCs A-C 106*a-c* because channel 36 is available for use in each of the GEO-LOCs A-C 106*a-c*. In some example implementations, the wireless terminal 108 may select channel 36 even though it may not be the channel with the strongest signal available at the time of receiving the AN connection information sets 606. For example, channel 31 may have a better signal strength than channel 36, but is only available for the limited durations during which the wireless terminal 108 traverses the GEO-LOC A 106*a* and the GEO-LOC C 106*c*.

Figure 7:
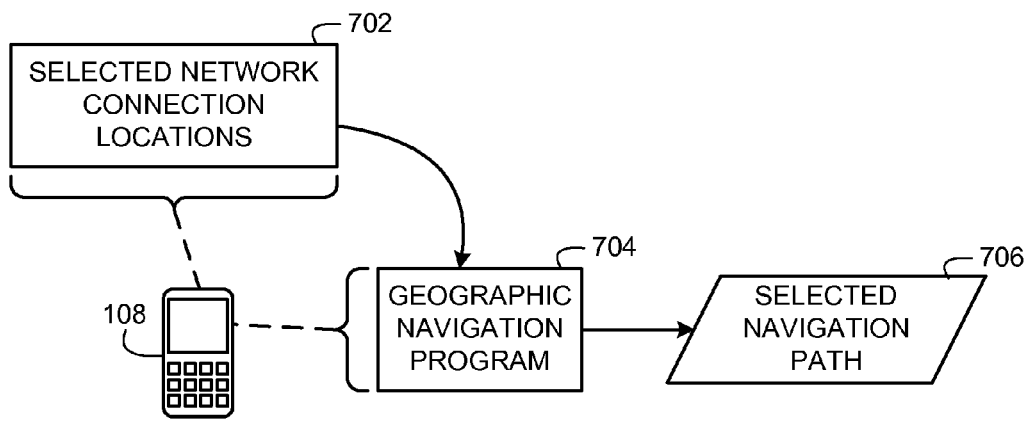
FIG. 7 depicts an example travel path selection technique that may be used in connection with a geographic navigation program based on AN connection plans selected by the wireless terminal of FIG. 1 along a predicted path.

FIG. 7 depicts an example travel path selection technique that may be used in connection with a mapping application based on AN connection plans selected by the wireless terminal 108 (FIGS. 1-6) along a predicted path (e.g., the predicted path 602 of FIG. 6). For example, if the wireless terminal 108 knows the general locations to which it will travel, the wireless terminal 108 may use AN connectivity information associated with the locations and determine a path traversing some of those locations that will allow it to establish the best AN connections available based on the AN connectivity information. For instance, if two neighboring geographic locations associated with different AN connectivity requirements are available to the wireless terminal 108, the wireless terminal 108 may indicate that one of the locations is preferable over the other because its associated AN connectivity information indicates the availability of a better connection with an AN (e.g., one of the ANs 102*a-b* of FIG. 1). Such a better connection may be based on channels with strongest transmission powers (e.g., signal strengths) or channels requiring the relatively lesser or the least channel changes when the wireless terminal 108 moves between different geographic locations as described above in connection with FIG. 6. In the same manner, the wireless terminal 108 can select a path of travel traversing selected network connection locations 702 that provide the overall best AN connectivity.

In the illustrated example of FIG. 7, a user-interactive geographic navigation program 704 may provide a user-selectable option to select a best connectivity route as a travel path selection criterion when the wireless terminal 108 selects a path of travel. When the wireless terminal 702 selects a path of travel traversing selected network connection locations 702 that provide AN connectivity per user-selected criteria (e.g., best signal strength, least connection configuration changes, maximizing duration of connectivity with one or more networks of a preferred network operator, etc.), the geographic navigation program 704 can generate selected path of travel data 706 (e.g., GPS waypoints) for use in providing navigation directions or assistance to a user. The geographic navigation program 704 may be a GPS-based program or any other type of geographic navigation program.

Figure 8:
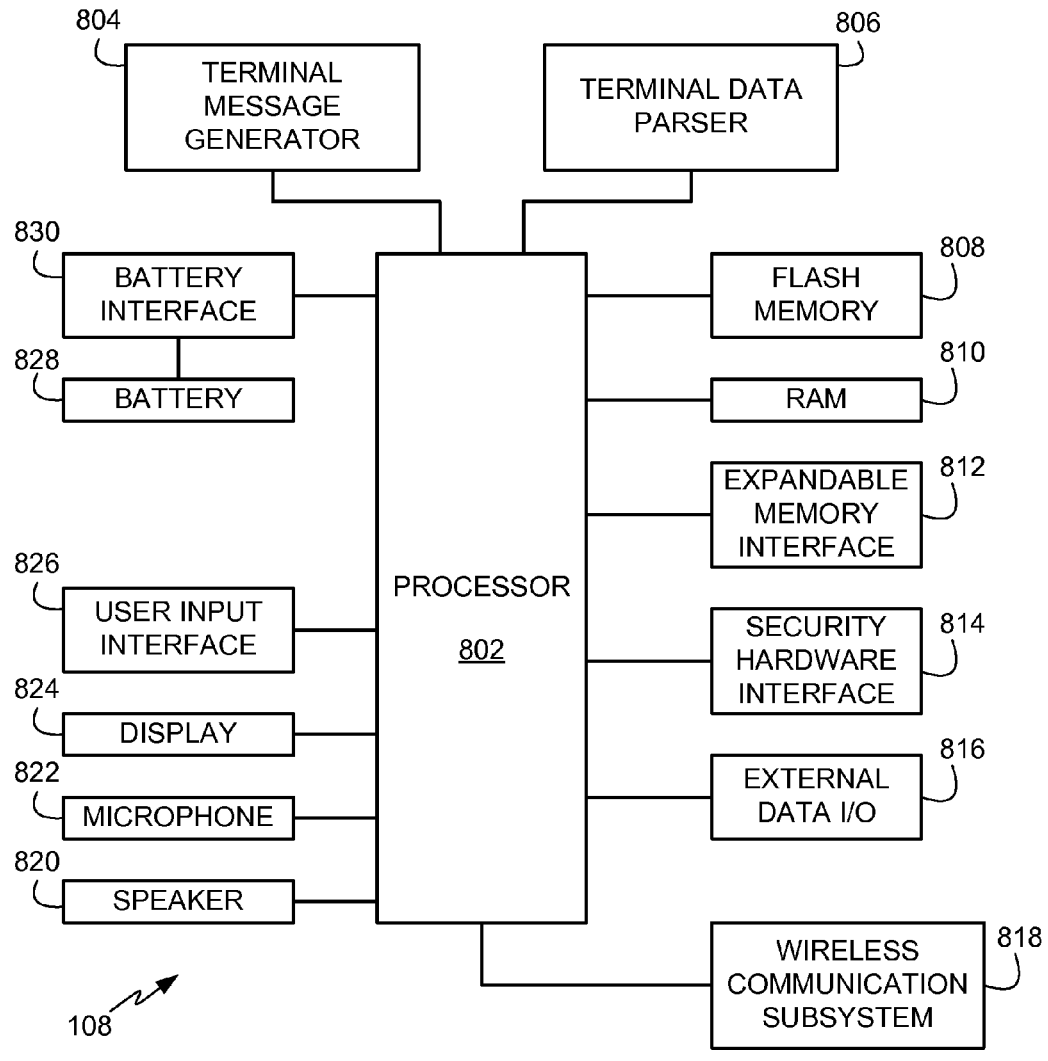
FIG. 8 depicts a detailed diagram of the example wireless terminal of FIGS. 1-7 that may be used to implement the example methods and apparatus described herein.

FIG. 8 is an example implementation of the wireless terminal 108 (FIGS. 1-7) shown in block diagram form. In the illustrated example, the wireless terminal 108 includes a processor 802 that may be used to control the overall operation of the wireless terminal 108. The processor 802 may be implemented using a controller, a general purpose processor, a digital signal processor, or any combination thereof.

The wireless terminal 108 also includes a terminal message generator 804 and a terminal data parser 806. The terminal message generator 804 may be used to generate queries and/or requests (e.g., the AN request message 310 of FIG. 3). The terminal data parser 806 may be used to retrieve frames of information from memory (e.g., a RAM 810) and retrieve particular information of interest from those frames. For example, the terminal data parser 806 may be used to retrieve information communicated in the AN response message 316 of FIG. 3. Although the terminal message generator 804 and the terminal data parser 806 are shown as separate from and connected to the processor 802, in some example implementations, the terminal message generator 804 and the terminal data parser 806 may be implemented in the processor 802 and/or in a wireless communication subsystem (e.g., a wireless communication subsystem 818). The terminal message generator 804 and the terminal data parser 806 may be implemented using any desired combination of hardware, firmware, and/or software. For example, one or more integrated circuits, discrete semiconductor components, and/or passive electronic components may be used. Thus, for example, the terminal message generator 804 and the terminal data parser 806, or parts thereof, could be implemented using one or more circuit(s), programmable processor(s), application specific integrated circuit(s) (ASIC(s)), programmable logic device(s) (PLD(s)), field programmable logic device(s) (FPLD(s)), etc. The terminal message generator 804 and the terminal data parser 806, or parts thereof, may be implemented using instructions, code, and/or other software and/or firmware, etc. stored on a machine accessible medium and executable by, for example, a processor (e.g., the example processor 802). When any of the appended apparatus claims are read to cover a purely software implementation, at least one of the terminal message generator 804 and the terminal data parser 806 is hereby expressly defined to include a tangible medium such as a solid state memory, a magnetic memory, a DVD, a CD, etc.

The wireless terminal 108 also includes a FLASH memory 808, a random access memory (RAM) 810, and an expandable memory interface 812 communicatively coupled to the processor 802. The FLASH memory 808 can be used to, for example, store computer readable instructions and/or data. In some example implementations, the FLASH memory 808 can be used to store one or more of the type of information and/or data structures discussed above in connection with FIGS. 1-7. The RAM 810 can also be used to, for example, store data and/or instructions.

The wireless terminal 108 is optionally provided with a security hardware interface 814 to, for example, receive a subscriber identity module (SIM) card, a universal SIM (USIM) card, or a near field communication (NFC) secure element from a wireless service provider. A SIM card may be used as an authentication parameter or registration parameter (e.g., a Federal Communications Commission (FCC) identifier in the United States of America) to authenticate or register the wireless terminal 108 for establishing a connection with a database (e.g., the TVWS database 110 of FIGS. 1 and 3), an access network (e.g., the ANs 102*a-b* and/or the WLAN AN 116 of FIG. 1), and/or an external network (e.g., the external network 112 of FIG. 1). The wireless terminal 108 is also provided with an external data I/O interface 816. The external data I/O interface 816 may be used by a user to transfer information to the wireless terminal 108 through a wired medium (e.g., Ethernet, universal serial bus (USB), etc.). A wired data transfer path may, for example, be used to communicate with the TVWS database 110.

The wireless terminal 108 is provided with a wireless communication subsystem 818 to enable wireless communications with APs (e.g., the APs 104*a-b* and/or the WLAN AP 118 of FIG. 1). Although not shown, the wireless terminal 108 may also have a long-range communication subsystem to receive messages from, and send messages to, a cellular wireless network. In the illustrated examples described herein, the wireless communication subsystem 818 can be configured in accordance with the IEEE® 802.11 standard and/or a TVWS standard for communicating with TVWS access networks (e.g., the ANs 102a-b). In other example implementations, the wireless communication subsystem 818 can be implemented using a BLUETOOTH® radio, a ZIGBEE® device, a wireless USB device, a radio frequency identification (RFID) device, an NFC device, an ultra-wideband (UWB) radio, a PAN radio, a WAN radio, a WMAN radio (e.g., for use in IEEE® 802.11 or WiMAX networks), a WRAN radio (e.g., for use in IEEE® 802.22 networks), a cellular radio, or a satellite communications radio. In some example implementations, the wireless communication subsystem 818 may be provided with multiple radio transceivers for multiple types of radio access technologies.

To enable a user to use and interact with or via the wireless terminal 108, the wireless terminal 108 is provided with a speaker 820, a microphone 822, a display 824, and a user input interface 826. The display 824 can be an LCD display, an e-paper display, etc. The user input interface 826 could be an alphanumeric keyboard and/or telephone-type keypad, a multi-direction actuator or roller wheel with dynamic button pressing capability, a touch panel, etc. In the illustrated example, the wireless terminal 108 is a battery-powered device and is, thus, provided with a battery 828 and a battery interface 830.

Figure 9:
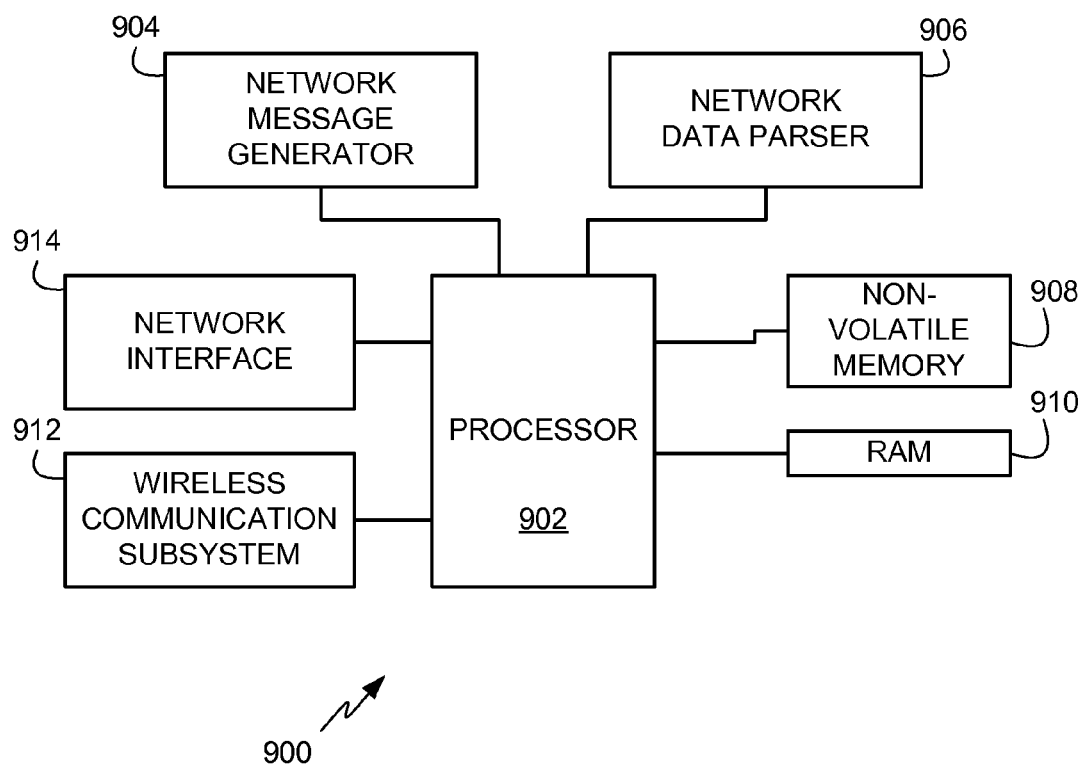
FIG. 9 depicts an example processor system for use in a network and that may be used to implement the example methods and apparatus described herein.

Turning now to FIG. 9, an example processor system 900 for use in a network system (e.g., the network system 100 of FIG. 1) is shown in block diagram form. Processor systems similar or identical to the processor system 900 may be used to implement the APs 104a-b, the WLAN AP 118 of FIG. 1, and/or associated NASs. The processor system 900 includes a processor 902 to perform the overall operations of the processor system 900. In addition, the processor system 900 includes a network message generator 904 to generate messages (e.g., the database request 312 and the AN response message 316 of FIG. 3) and a network data parser 906 to retrieve information from received messages (e.g., the AN request message 310 and the database response 314 of FIG. 3). The network message generator 904 and the network data parser 906 may be implemented in the processor 902 and/or a communication subsystem (e.g., a wireless communication subsystem 912 and/or a network interface 914) using any combination of hardware, firmware, and/or software including instructions stored on a computer-readable medium.

The processor system 900 also includes a FLASH memory 908 and a RAM 910, both of which are coupled to the processor 902. The FLASH memory 908 may be configured to store one or more of the types of information and/or data structures discussed above in connection with FIGS. 1-7.

In some example implementations (e.g., the APs 102a-b and the WLAN AP 118 of FIG. 1), to communicate with wireless terminals such as the wireless terminal 108, the processor system 900 is provided with a wireless communication subsystem 912, which may be substantially similar or identical to the wireless communication subsystem 818 (FIG. 8) of the wireless terminal 108. To exchange communications with the TVWS database 110 (and/or any intermediate network entities (e.g., the APs 104a-b, the WLAN AP 118 of FIG. 1, associated NASs, etc.), the processor system 900 is provided with a network interface 914.

FIGS. 10-13 depict example flow diagrams representative of processes that may be implemented using, for example, computer readable instructions that may be used to predict future locations of wireless terminals, obtain network connectivity information from a database (e.g., the TVWS database 110 of FIGS. 1 and 3) indicative of capabilities and requirements for connecting to access networks (e.g., the ANs 102a-b of FIG. 1), select network connectivity configurations, and establish connections with access networks based on such configurations. The example processes of FIGS. 10-13 may be performed using one or more processors, controllers, and/or any other suitable processing devices. For example, the example processes of FIGS. 10-13 may be implemented using coded instructions (e.g., computer readable instructions) stored on one or more tangible computer readable media such as flash memory, read-only memory (ROM), and/or random-access memory (RAM). As used herein, the term tangible computer readable medium is expressly defined to include any type of computer readable storage and to exclude propagating signals. Additionally or alternatively, the example processes of FIGS. 10-13 may be implemented using coded instructions (e.g., computer readable instructions) stored on one or more non-transitory computer readable media such as flash memory, read-only memory (ROM), random-access memory (RAM), cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example processes of FIGS. 10-13 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example processes of FIGS. 10-13 may be implemented manually or as any combination(s) of any of the foregoing techniques, for example, any combination of firmware, software, discrete logic and/or hardware. Further, although the example processes of FIGS. 10-13 are described with reference to the flow diagrams of FIGS. 10-13, other methods of implementing the processes of FIGS. 10-13 may be employed. For example, the order of execution of the blocks may be changed, and/or some of the blocks described may be changed, eliminated, sub-divided, or combined. Additionally, any or all of the example processes of FIGS. 10-13 may be performed sequentially and/or in parallel by, for example, separate processing threads, processors, devices, discrete logic, circuits, etc.

Figure 10:
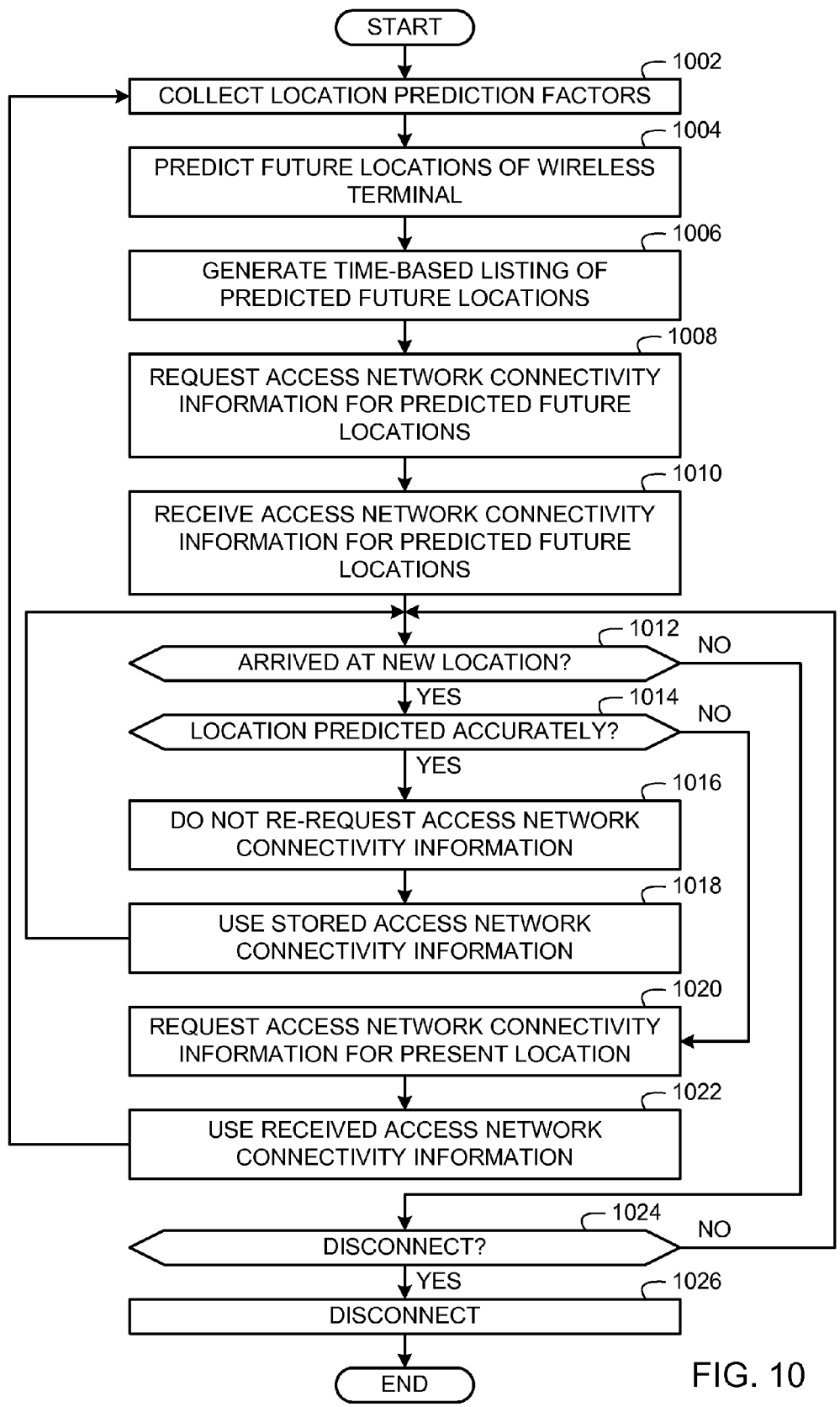
FIG. 10 depicts an example flow diagram representative of a process that may be implemented using computer readable instructions that may be used to predict near-future locations for use in selecting AN connection configurations for connecting to access networks.

Now turning to FIG. 10, the depicted example process may be used to predict near-future locations for use in selecting AN connection configurations for connecting to the ANs (e.g., the ANs 102a-b of FIG. 1). Initially, the wireless terminal 108 collects location prediction factors (block 1002). For example, location prediction factors may include travel speed, direction of travel, geographic map data, prior history, previous actual locations (e.g., the previous actual location 204 of FIG. 2), present actual locations (e.g., the present actual location 206 of FIG. 2), user input, web browser searches (e.g., map queries, travel direction search queries, etc.), and/or any other types of information that may be used to predict future locations of the wireless terminal 108.

The wireless terminal 108 predicts its future locations (block 1004) and generates a time-based listing of the predicted future locations (block 1006). For example, the wireless terminal 108 may predict the future locations 208 of FIG. 2 and store the predicted future locations 208 in the predicted connectivity data structure 302 of FIG. 3 along with corresponding times in the time entries 304 of when the wireless terminal 108 will be located at those locations.

The wireless terminal 108 requests AN connectivity information for the predicted future locations (block 1008) using, for example, the AN request message 310 as described above in connection with FIG. 3. The wireless terminal 108 receives the requested AN connectivity information for the predicted future locations (block 1010). For example, the wireless terminal 108 may received the requested AN connectivity information via the AN response message 316 as described above in connection with FIG. 3. The wireless terminal 108 may store the received AN connectivity information in the predicted connectivity data structure 302 as ones of the AN connectivity information sets 308.

Although the operations of blocks 1002, 1004, 1006, 1008, and 1010 are described as being performed by the wireless terminal 108, in some example implementations, such operations may instead be performed by a network device (e.g., the APs 104a-b, the WLAN AP 118, associated NASs, and/or the TVWS database 110 of FIG. 1). For example, such network devices may collect location prediction parameters from the wireless terminal 108 and/or other sources, predict the future locations of the wireless terminal 108, push AN connectivity information (e.g., via the push message 502 of FIG. 5) corresponding to such predicted future locations to the wireless terminal 108.

When the wireless terminal 108 determines that it has arrived at a new location (block 1012), it determines whether the new location corresponds to an accurate prediction of one of the predicted future locations in the predicted connectivity data structure 302 (block 1014). If the new location matches one of the predicted future locations, the wireless terminal 108 determines that the location was predicted accurately (block 1014) and does not need to re-request AN connectivity information from the TVWS database 110 (FIGS. 1 and 3) (block 1016). Instead, the wireless terminal 108 uses the AN network connectivity information stored in one of the AN network connectivity information sets 308 corresponding to the new location to establish or maintain an AN connection (block 1018). Control then returns to block 1012.

If at block 1014, the new location was not accurately predicted (i.e., the wireless terminal 108 determines that its new location does not match one of the predicted future locations in the predicted connectivity data structure 302), the wireless terminal 108 requests AN connectivity information for its present location (block 1020) from the TVWS database 110. For example, the wireless terminal 108 may request the AN connectivity information using the AN request message 310 as described above in connection with FIG. 3 for its present location. The wireless terminal 108 then uses the received AN connectivity information 1022 to establish or maintain an AN connection (block 1022). Control then returns to block 1002, and the wireless terminal 108 can predict subsequent future locations based on its present location.

When the wireless terminal 108 determines at block 1012 that it has not arrived at a new location, the wireless terminal 108 determines whether it should disconnect (block 1024). For example, the wireless terminal 108 may disconnect in response to receiving a power off signal or a disconnect command from a user. If the wireless terminal 108 determines not to disconnect (block 1024), control returns to block 1012 to monitor the location of the wireless terminal 108. Otherwise, the wireless terminal 108 disconnects a present AN connection (block 1026), and the example process of FIG. 10 ends.

Figure 11:
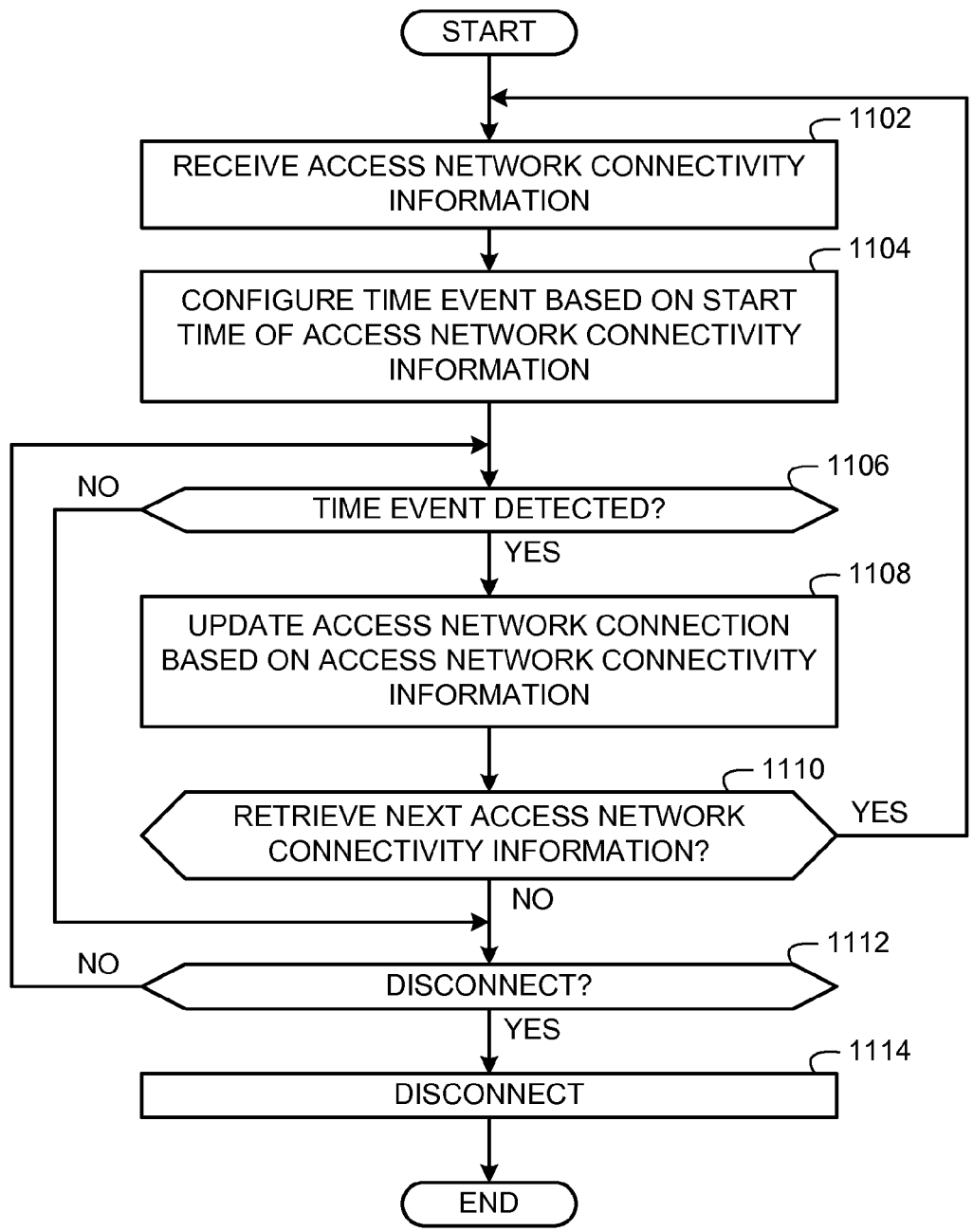
FIG. 11 depicts an example flow diagram representative of a process that may be implemented using computer readable instructions that may be used to implement AN connectivity changes between the wireless terminal and an access network based on timing information corresponding to the start of enforcing AN connectivity information.

FIG. 11 depicts an example process that may be used to implement AN connectivity changes between the wireless terminal 108 and an access network based on timing information corresponding to the start of enforcing AN connectivity information. Initially, the wireless terminal 108 receives AN connectivity information (block 1102). For example, the wireless terminal 108 may retrieve the AN connectivity information as discussed above in connection with FIG. 3 or may receive the AN connectivity information via the push message 502 as described above in connection with FIG. 5.

The wireless terminal 108 configures a time event based on a start time corresponding to the received AN connectivity information (block 1104). For example, the wireless terminal 108 can store an approaching start time from one of the time entries 402 and a corresponding AN connectivity information set 406 into the timed change register 408 as described above in connection with FIG. 4. Alternatively, as described above in connection with FIG. 5, the wireless terminal 108 can store the start time 504 and corresponding AN connectivity information 508 from the push message 502 in the timed change register 408.

When the wireless terminal 108 detects an assertion or triggering of the time event (block 1106) as described above in connection with FIGS. 4 and 5, the wireless terminal 108 updates an AN connection based on the AN connectivity information (block 1108). The wireless terminal 108 determines whether it should retrieve next AN connectivity information (block 1110). For example, if the wireless terminal 108 determines that another one of the time entries 402 is approaching a current time, the wireless terminal 108 can retrieve a corresponding one of the AN connectivity information sets 406. Alternatively, the wireless terminal 108 may receive a push message (e.g., the push message 502) with next AN connectivity information. If the wireless terminal 108 determines that it should retrieve next AN connectivity information (block 1110), control returns to block 1102.

If the wireless terminal 108 determines that it should not retrieve next AN connectivity information (block 1110) or if the wireless terminal 108 has not detected the time event (block 1106), the wireless terminal 108 determines whether it should disconnect an AN connection (block 1112). If the wireless terminal 108 determines that it should not disconnect an AN connection (block 1112), control returns to block 1106. Otherwise, the wireless terminal 108 disconnects the AN connection (block 1114) and the example process of FIG. 11 is ended.

Figure 12:
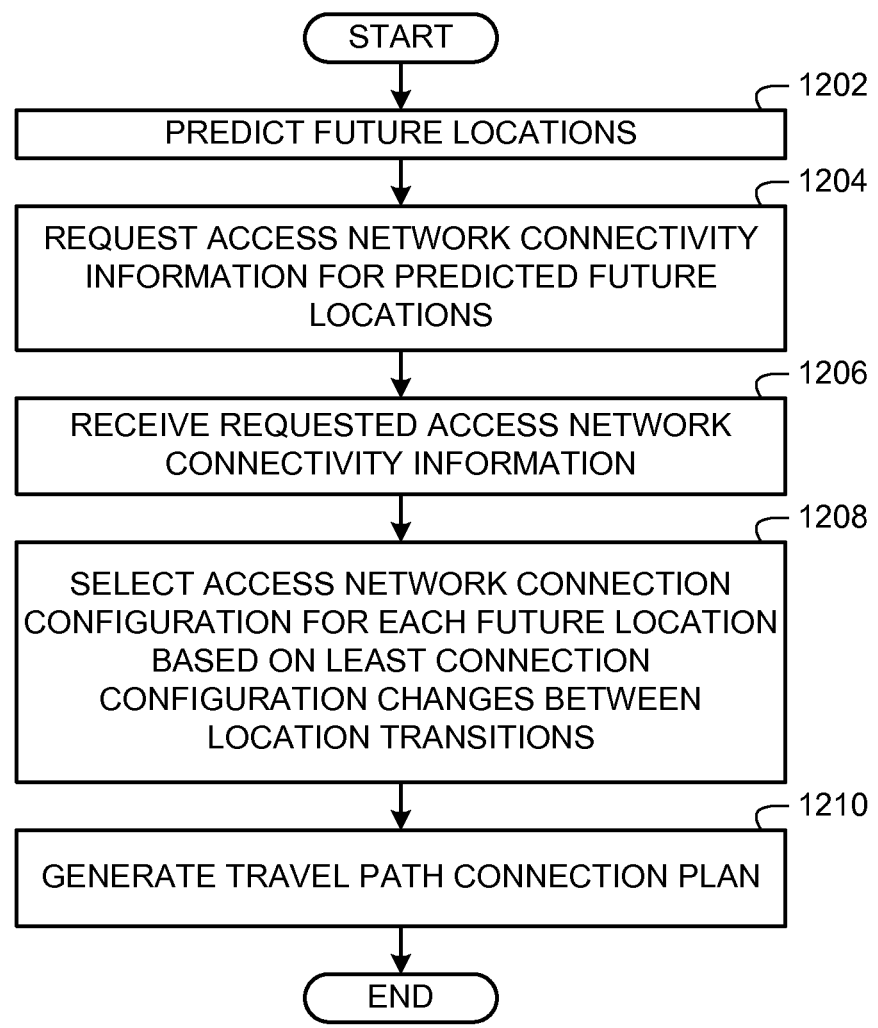
FIG. 12 depicts an example flow diagram representative of a process that may be implemented using computer readable instructions that may be used to select AN connection configurations for establishing AN connections requiring relatively fewer, lesser, or least amounts or quantities of configuration changes while traveling along different geographic locations associated with different AN connectivity requirements.

FIG. 12 depicts an example process that may be used to select AN connection configurations (e.g., connection configurations stored in the travel path connection plan data structure 614 of FIG. 6) for establishing AN connections requiring relatively lesser or the least amount of configuration changes while traveling along different geographic locations (e.g., the GEO-LOC A-C 106a-c of FIG. 6) associated with different AN connectivity requirements. Initially, the wireless terminal 108 (or a network device) predicts future locations (e.g., the predicted future locations 208 of FIG. 2) of the wireless terminal 108 (block 1202). The wireless terminal 108 requests AN connectivity information for predicted future locations (e.g., the predicted future locations 208) of the wireless terminal 108 (block 1204) via, for example, the AN request message 310 as described above in connection with FIG. 3. The wireless terminal 108 receives the requested AN connectivity information (block 1206) via, for example, the AN response message 316 as described above in connection with FIG. 3. Alternatively, the AN connectivity information may be pushed by a network device via, for example, the push message 502 as described above in connection with FIG. 5 without requiring the wireless terminal 108 to request the AN connectivity information.

The wireless terminal 108 selects AN connection configurations for each predicted future location based on relatively lesser or the least connection configuration changes that would be required when the wireless terminals 108 moves between the predicted future locations (block 1208) as described above in connection with FIG. 6. The wireless terminal 108 then generates a travel path connection plan (block 1210) including the AN connectivity configurations for each of the predicted future locations. For example, the wireless terminal 108 may store the AN connectivity configurations in the travel path connection plan data structure 614 of FIG. 6. The example process of FIG. 12 then ends.

Figure 13:
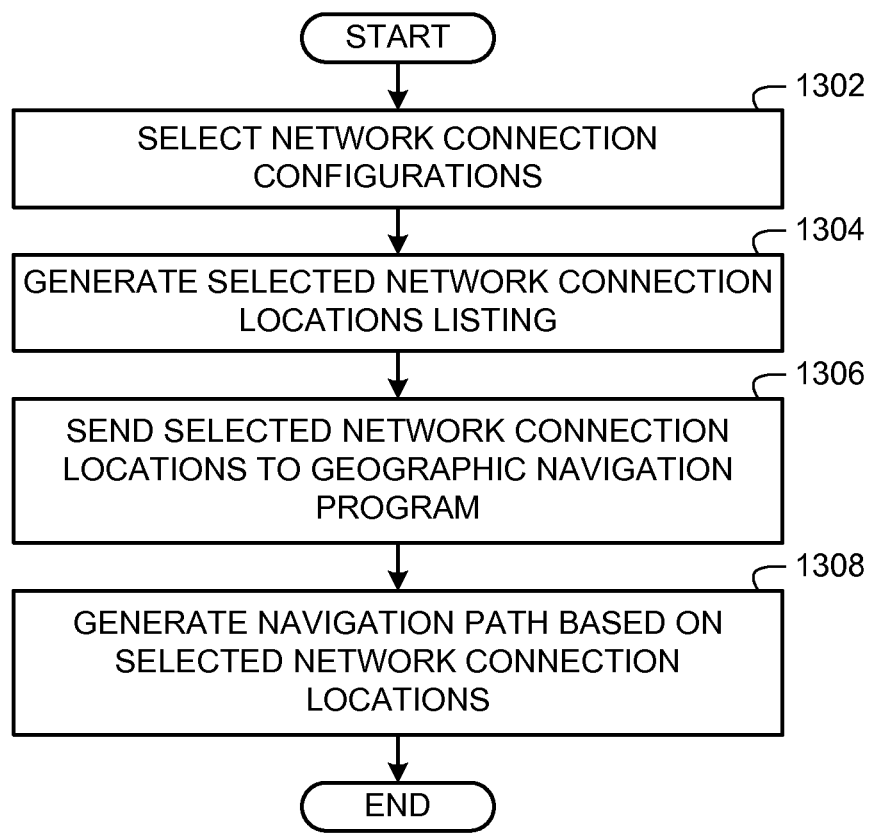
FIG. 13 depicts an example flow diagram representative of a process that may be implemented using computer readable instructions that may be used to select a travel path in connection with a geographic navigation program based on AN connection locations selected by the wireless terminal of FIGS. 1-7.

FIG. 13 depicts an example process that may be used to select a travel path (e.g., the selected navigation path 706 of FIG. 7) in connection with the geographic navigation program 704 (FIG. 7) based on AN connection locations selected by the wireless terminal 108 of FIGS. 1-8. Initially, the wireless terminal 108 selects AN connection configurations (block 1302). For example, the wireless terminal 108 may select AN connection configurations along selected locations as described above in connection with FIGS. 6 and 12. The wireless terminal 108 generates the selected network connection locations listing 702 (FIG. 7) (block 1304), and sends the selected network connection locations listing 702 to the geographic navigation program 704 (block 1306). The geographic navigation program 704 generates the selected navigation path 706 (FIG. 7) based on the selected network connection locations 702 (block 1308). The example process of FIG. 13 then ends.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method to retrieve network connectivity information based on a predicted future location of a wireless terminal, the method comprising:
   predicting at least one future location of a mobile wireless access point configured to connect to a wireless terminal and access networks to enable the wireless terminal to connect to the access networks via the mobile wireless access point; and
   sending a request from the mobile wireless access point to a database storing temporal ranges during which network connectivity information is valid in different geographic areas, the request requesting at least first and second network connectivity information sets for connecting the wireless terminal to the mobile wireless access point to provide the wireless terminal with wireless communication coverage while traveling to the at least one future location, the first network connectivity information associated with a first geographic location, and the second network connectivity information associated with a second geographic location.

2. A method as defined in claim 1, wherein the database is located in an external network relative to the access networks.

3. A method as defined in claim 2, wherein the database is a television white space database.

4. A method as defined in claim 1, wherein the requesting of the at least first and second network connectivity information sets is performed by sending the request before the wireless terminal is in the first or second geographic locations.

5. A method as defined in claim 1, wherein the access networks are white space networks.

6. A method as defined in claim 1, wherein the predicting of the at least one future location of the mobile wireless access point is performed based on at least one of a traveling speed of the mobile wireless access point or a direction of travel of the mobile wireless access point.

7. A method as defined in claim 1, wherein the first network connectivity information set includes network connectivity requirements to avoid interfering with at least one other device operating in the same frequency channels over which the mobile wireless access point is capable of connecting with the wireless terminal.

8. A method as defined in claim 7, wherein the at least one other device is a licensed device registered to operate in the first geographic location using at least one of the same frequency channels.

9. A method as defined in claim 1, further comprising selecting one of the first network connectivity information or the second network connectivity information based on which of the first and second network connectivity information requires a least quantity of connection configuration changes while traveling to the at least one future location.

10. A method as defined in claim 9, wherein the quantity of connection configuration changes comprises changes to a frequency channel to be used between the wireless terminal and the mobile wireless access point.

11. A tangible machine readable medium having instructions stored thereon that, when executed, cause a machine to perform the method of claim 1.

12. An apparatus to retrieve network connectivity information based on a predicted future location of a wireless terminal, the apparatus comprising:
   a processor configured to:
      predict at least one future location of a mobile wireless access point configured to connect to a wireless terminal and access networks to enable the wireless terminal to connect to the access networks via the mobile wireless access point; and
      send a request from the mobile wireless access point to a database storing temporal ranges during which network connectivity information is valid in different geographic areas, the request to request at least first and second network connectivity information sets for connecting the wireless terminal to the mobile wireless access point to provide the wireless terminal with wireless communication coverage while traveling to the at least one future location, the first network connectivity information associated with a first geographic location, and the second network connectivity information associated with a second geographic location.

13. An apparatus as defined in claim 12, wherein the database is located in an external network relative to the access networks.

14. An apparatus as defined in claim 13, wherein the database is a television white space database.

15. An apparatus as defined in claim 12, wherein the processor is configured to request the at least first and second network connectivity information sets by sending the request before the wireless terminal is in the first or second geographic locations.

16. An apparatus as defined in claim 12, wherein the access networks are white space networks.

17. An apparatus as defined in claim 12, wherein the processor is configured to predict the at least one future location of the mobile wireless access point based on at least one of a traveling speed of the mobile wireless access point or a direction of travel of the mobile wireless access point.

18. An apparatus as defined in claim 12, wherein the first network connectivity information set includes network connectivity requirements to avoid interfering with at least one other device operating in the same frequency channels over which the mobile wireless access point is capable of connecting with the wireless terminal.

19. An apparatus as defined in claim 12, wherein the processor is further configured to select one of the first network connectivity information or the second network connectivity information based on a quantity of connection configuration changes while traveling to the at least one future location.

20. An apparatus as defined in claim 19, wherein the processor is to give channel availability duration a higher priority over signal strength when selecting one of the first network connectivity information or the second network connectivity information.

* * * * *